(12) United States Patent
Payne

(10) Patent No.: US 10,668,954 B2
(45) Date of Patent: Jun. 2, 2020

(54) CAB AND HOOD SUSPENSION WITH HOOD TILT

(71) Applicant: John Payne, Concord, NC (US)

(72) Inventor: John Payne, Concord, NC (US)

( * ) Notice: Subject to any disclaimer, the term of this patent is extended or adjusted under 35 U.S.C. 154(b) by 250 days.

(21) Appl. No.: 15/827,827

(22) Filed: Nov. 30, 2017

(65) Prior Publication Data

US 2019/0161127 A1 May 30, 2019

(51) Int. Cl.
*B62D 25/12* (2006.01)
*B62D 33/067* (2006.01)
*B62D 49/00* (2006.01)
*B62D 33/077* (2006.01)
*B62D 33/06* (2006.01)

(52) U.S. Cl.
CPC .......... *B62D 25/12* (2013.01); *B62D 33/067* (2013.01); *B62D 33/0608* (2013.01); *B62D 33/077* (2013.01); *B62D 49/005* (2013.01)

(58) Field of Classification Search
CPC .. B62D 25/12; B62D 33/0608; B62D 33/077; B62D 49/005; B62D 33/067; B62D 33/0604; B60G 99/002; B60G 2204/162
See application file for complete search history.

(56) References Cited

U.S. PATENT DOCUMENTS

| | | |
|---|---|---|
| 2,737,254 A | 3/1956 | Bayley |
| 2,781,102 A * | 2/1957 | Prichard ................ B62D 25/10 180/89.14 |
| 3,059,958 A * | 10/1962 | Lindblom .............. B62D 33/06 296/35.1 |
| 3,165,164 A * | 1/1965 | Hostetler ............... B60K 11/04 180/89.15 |
| 3,419,099 A * | 12/1968 | Brumbaugh ........... B62D 25/10 180/69.24 |
| 3,618,692 A * | 11/1971 | Stikeleather .......... B60R 21/131 180/89.14 |
| 3,765,500 A | 10/1973 | Reeves |
| 3,797,883 A | 3/1974 | Steiner et al. |
| 3,831,999 A | 8/1974 | Sonneborn |
| 3,944,017 A * | 3/1976 | Foster ................ B62D 33/0608 180/89.15 |
| 3,948,341 A | 4/1976 | Foster |
| 3,972,557 A | 8/1976 | Hudston et al. |
| 4,043,584 A * | 8/1977 | Wagner .................. B62D 27/04 296/35.1 |
| 4,203,499 A * | 5/1980 | Miyata ................. B60K 5/1216 180/312 |
| 4,265,328 A * | 5/1981 | Rowa ................. B62D 33/0604 180/89.13 |

(Continued)

*Primary Examiner* — Paul N Dickson
*Assistant Examiner* — Timothy Wilhelm
(74) *Attorney, Agent, or Firm* — Jeffrey C. Watson; Mathew L. Grell; Grell & Watson Patent Attorneys LLC

(57) ABSTRACT

A cab and hood suspension system includes a cab suspension system, a hood suspension system, and a hood tilt system. The cab suspension system includes supporting spring elements and cab linkage configured to control movement of a cab relative to a chassis. The hood suspension system includes hood linkage configured to locate the hood relative to the chassis. The hood linkage is configured to match the movement of the cab linkage. The hood tilt system is provided by the hood linkage of the hood suspension system.

19 Claims, 17 Drawing Sheets

(56) References Cited

U.S. PATENT DOCUMENTS

| | | | | |
|---|---|---|---|---|
| 4,275,918 A * | 6/1981 | Franco | B62D 33/0604 | 180/89.12 |
| 4,359,119 A * | 11/1982 | Kammerman | B62D 25/10 | 180/69.21 |
| 4,378,856 A * | 4/1983 | Miller | B62D 33/067 | 180/89.14 |
| 4,463,818 A | 8/1984 | Sonneborn | | |
| 4,566,552 A | 1/1986 | Hoffman et al. | | |
| 4,871,189 A * | 10/1989 | Van Breemen | B60G 11/30 | 267/64.27 |
| 4,921,062 A * | 5/1990 | Marlowe | B62D 25/10 | 180/89.14 |
| 5,044,455 A * | 9/1991 | Tecco | B60G 99/002 | 180/89.13 |
| 5,101,921 A * | 4/1992 | West | E05D 3/145 | 16/370 |
| 5,368,118 A * | 11/1994 | Hoefle | B62D 33/0604 | 180/89.12 |
| 5,623,410 A * | 4/1997 | Furihata | B60G 17/0195 | 180/89.13 |
| 5,730,240 A * | 3/1998 | Hoffman | B62D 25/12 | 180/68.4 |
| 5,839,276 A | 11/1998 | Sonneborn | | |
| 5,890,556 A * | 4/1999 | Shearn | B62D 25/12 | 16/273 |
| 5,975,228 A * | 11/1999 | Parfitt | B62D 25/12 | 180/69.21 |
| 6,029,764 A * | 2/2000 | Schubert | B62D 33/0608 | 180/89.12 |
| 6,206,121 B1 * | 3/2001 | Michel | B60G 17/025 | 180/89.13 |
| 6,206,422 B1 * | 3/2001 | Goddard | B62D 33/0604 | 280/788 |
| 6,394,211 B1 * | 5/2002 | Palenchar | B62D 25/10 | 180/69.21 |
| 6,439,651 B1 * | 8/2002 | Johansson | B62D 33/067 | 180/89.12 |
| 6,454,035 B1 * | 9/2002 | Waskow | B62D 33/067 | 180/69.21 |
| 6,637,531 B2 * | 10/2003 | Palenchar | B62D 25/10 | 180/69.21 |
| 6,719,077 B2 * | 4/2004 | Connett | B62D 25/10 | 180/69.21 |
| 6,726,272 B1 * | 4/2004 | Puterbaugh | B60G 99/00 | 296/190.01 |
| 6,758,294 B2 * | 7/2004 | Peddycord | B62D 33/0604 | 180/89.12 |
| 6,805,215 B2 * | 10/2004 | Puterbaugh | B60G 7/001 | 180/89.13 |
| 6,898,501 B2 * | 5/2005 | Schubert | B60G 17/0165 | 180/89.12 |
| 6,910,545 B2 * | 6/2005 | Haun | B62D 25/10 | 180/69.2 |
| 7,029,059 B2 * | 4/2006 | Bernhardt | B62D 33/0608 | 296/190.05 |
| 7,036,618 B2 * | 5/2006 | Telford | B62D 25/10 | 180/69.2 |
| 7,240,754 B2 * | 7/2007 | Barta | B62D 33/0608 | 180/89.12 |
| 7,472,946 B2 * | 1/2009 | Hollenbeck | B62D 25/10 | 296/190.04 |
| 7,695,054 B2 * | 4/2010 | Haeusler | B60G 99/002 | 180/89.13 |
| 7,712,420 B2 * | 5/2010 | Scott | B61C 17/04 | 105/342 |
| 7,770,680 B2 | 8/2010 | Chen et al. | | |
| 7,849,946 B2 * | 12/2010 | Åkeson | B62D 33/067 | 180/89.14 |
| 7,950,727 B2 * | 5/2011 | Haeusler | B62D 33/0608 | 296/190.07 |
| 8,065,054 B2 * | 11/2011 | Tarasinski | B60G 17/016 | 280/5.5 |
| 8,127,880 B2 * | 3/2012 | Chunduru | B62D 33/067 | 180/89.14 |
| 8,180,532 B2 | 5/2012 | O'Halloran et al. | | |
| 8,356,858 B2 * | 1/2013 | Jang | E02F 9/166 | 296/190.07 |
| 8,608,234 B2 * | 12/2013 | Haeusler | B60G 99/006 | 280/124.106 |
| 8,800,703 B2 | 8/2014 | Miller et al. | | |
| 8,807,633 B2 * | 8/2014 | Milburn | B62D 33/0604 | 280/756 |
| 8,820,456 B2 * | 9/2014 | Virtanen | B62D 33/0608 | 180/89.12 |
| 8,840,172 B2 * | 9/2014 | Haller | B60G 17/0155 | 296/190.07 |
| 8,887,849 B2 * | 11/2014 | Hite | E05D 5/0207 | 180/69.2 |
| 8,936,300 B2 | 1/2015 | Davis et al. | | |
| 8,991,538 B2 * | 3/2015 | Angelo | B62D 33/063 | 180/89.12 |
| 9,308,944 B2 * | 4/2016 | Hanson | B62D 25/182 | |
| 9,975,582 B2 * | 5/2018 | Rausch | B62D 33/073 | |
| 10,093,264 B2 * | 10/2018 | Scott | B62D 33/0617 | |
| 10,343,729 B2 * | 7/2019 | Benevelli | B60G 15/063 | |
| 2005/0082127 A1 * | 4/2005 | Barber | B60G 21/073 | 188/266.2 |
| 2006/0086551 A1 * | 4/2006 | Cleland | B62D 25/12 | 180/69.2 |
| 2006/0131801 A1 * | 6/2006 | Barickman | B62D 33/0604 | 267/293 |
| 2006/0255623 A1 * | 11/2006 | Haller | B60G 17/0155 | 296/190.07 |
| 2008/0265625 A1 * | 10/2008 | List | B62D 21/152 | 296/190.06 |
| 2018/0178856 A1 * | 6/2018 | Davis | B60G 17/08 | |
| 2019/0002033 A1 * | 1/2019 | Vreede | B62D 33/0604 | |
| 2019/0152539 A1 * | 5/2019 | Lee | B62D 33/0604 | |
| 2019/0193795 A1 * | 6/2019 | Young | B62D 24/04 | |

* cited by examiner

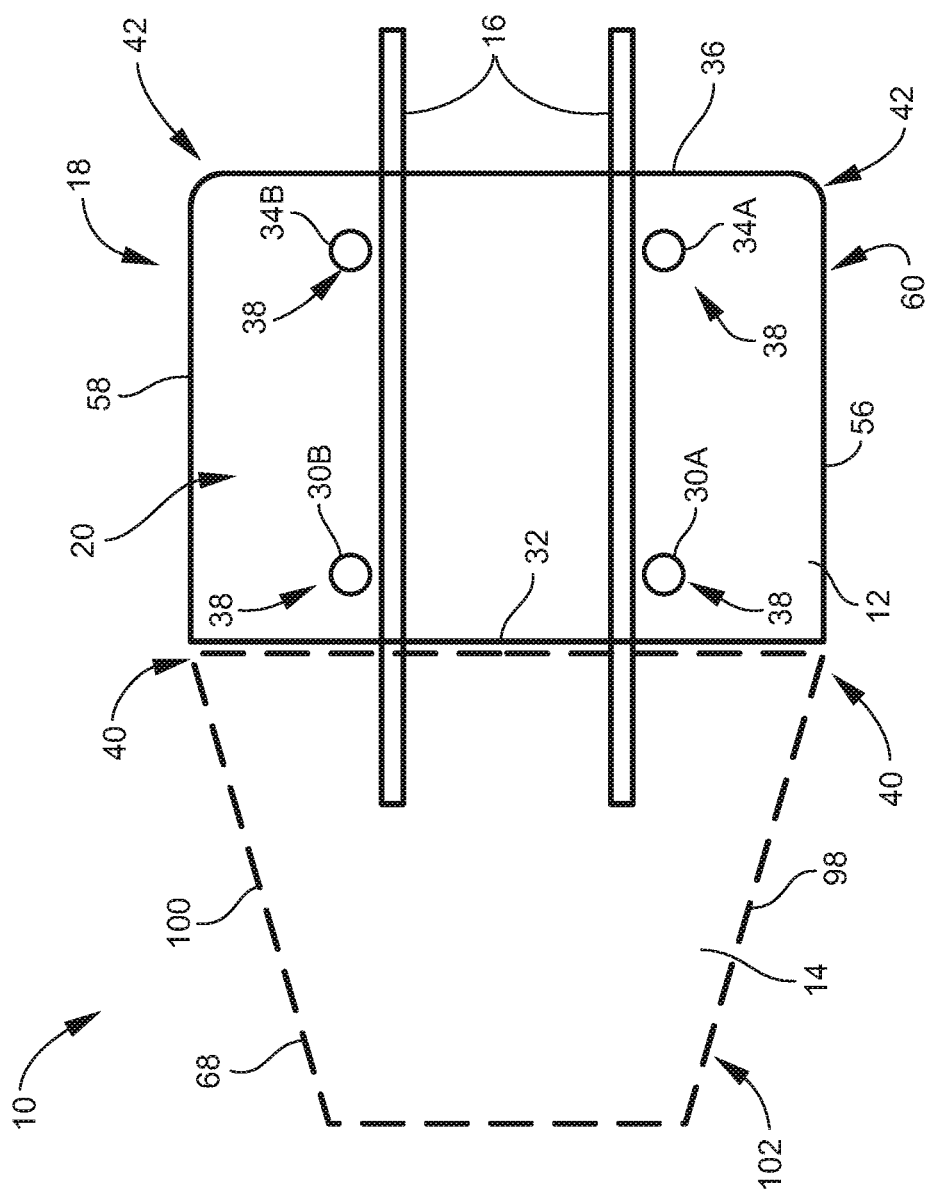

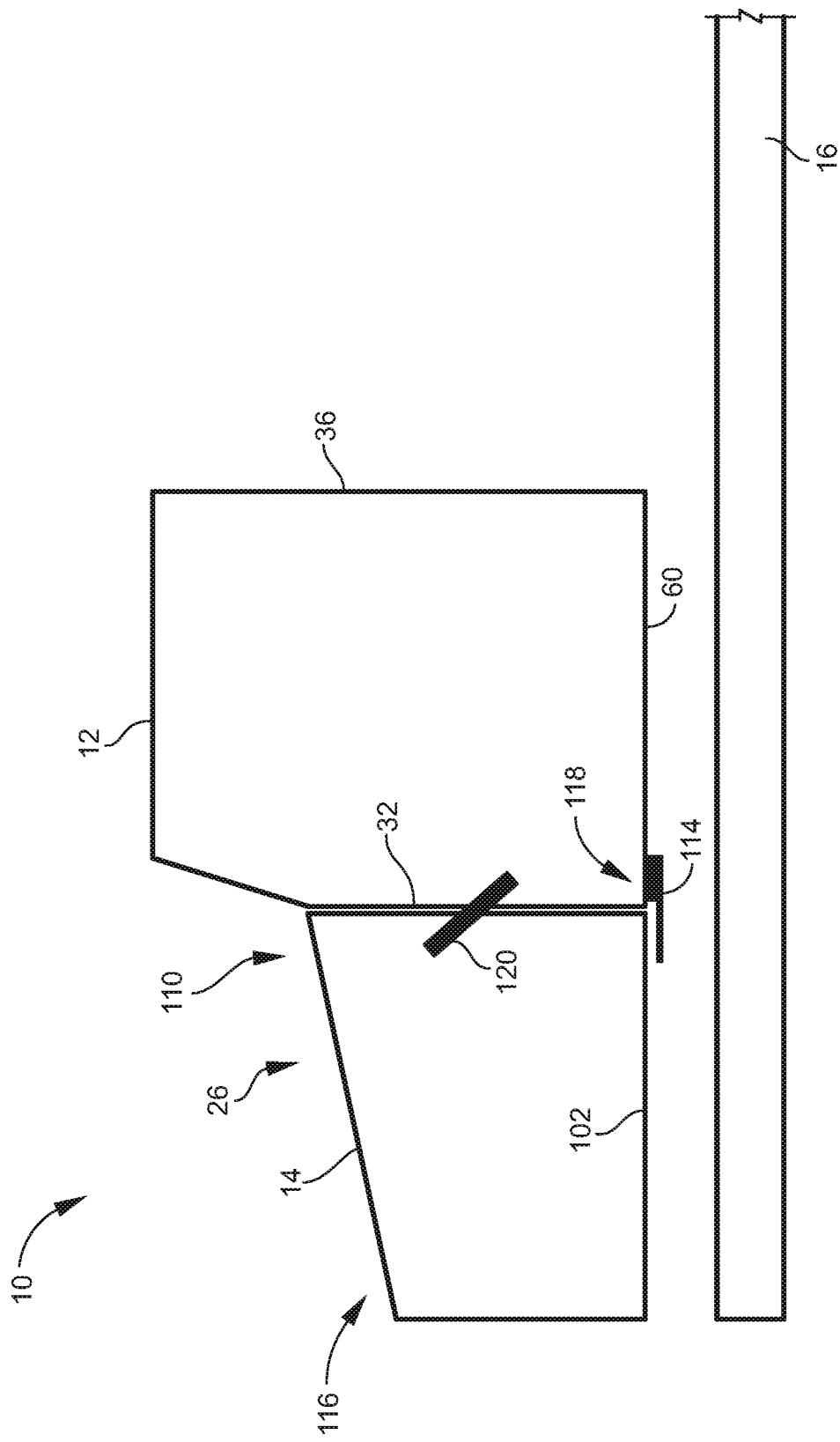

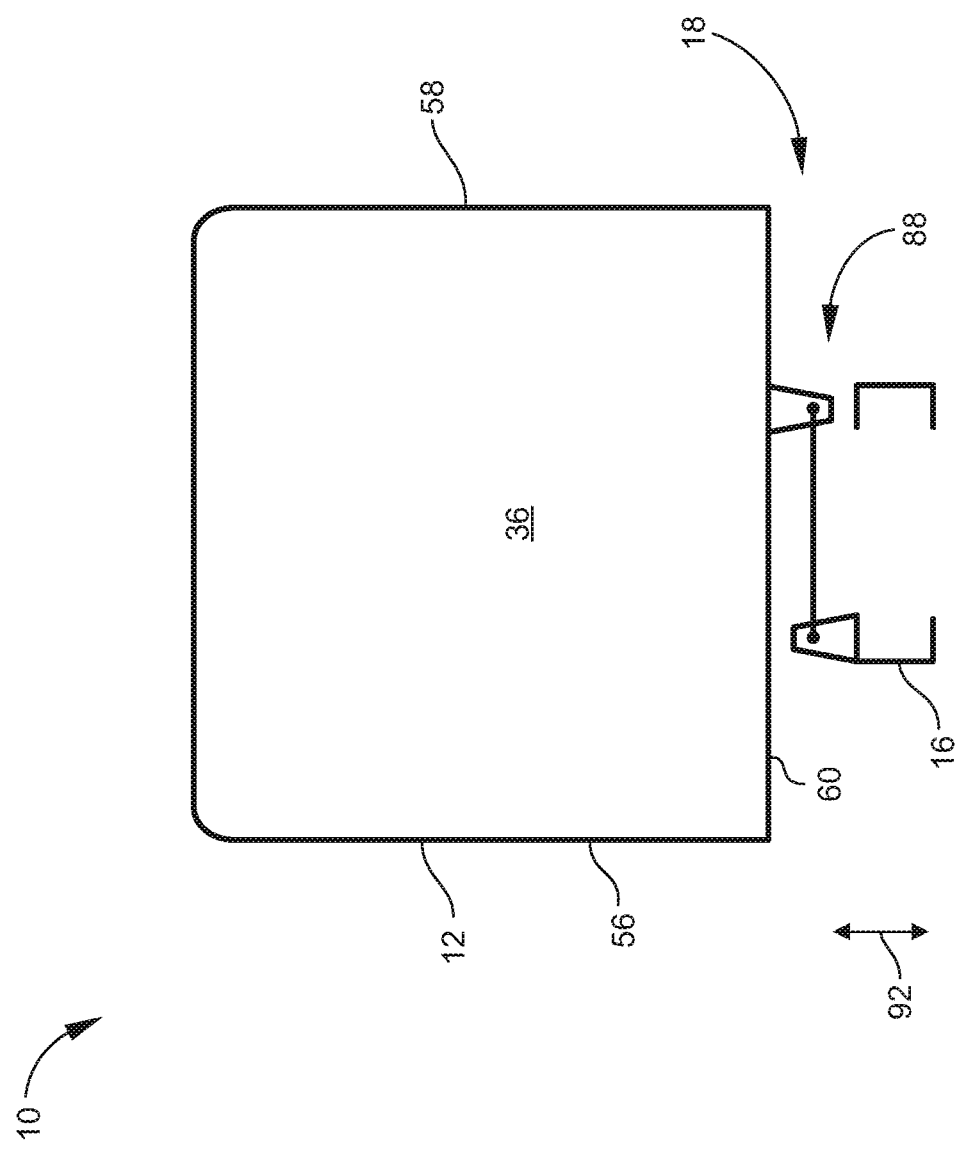

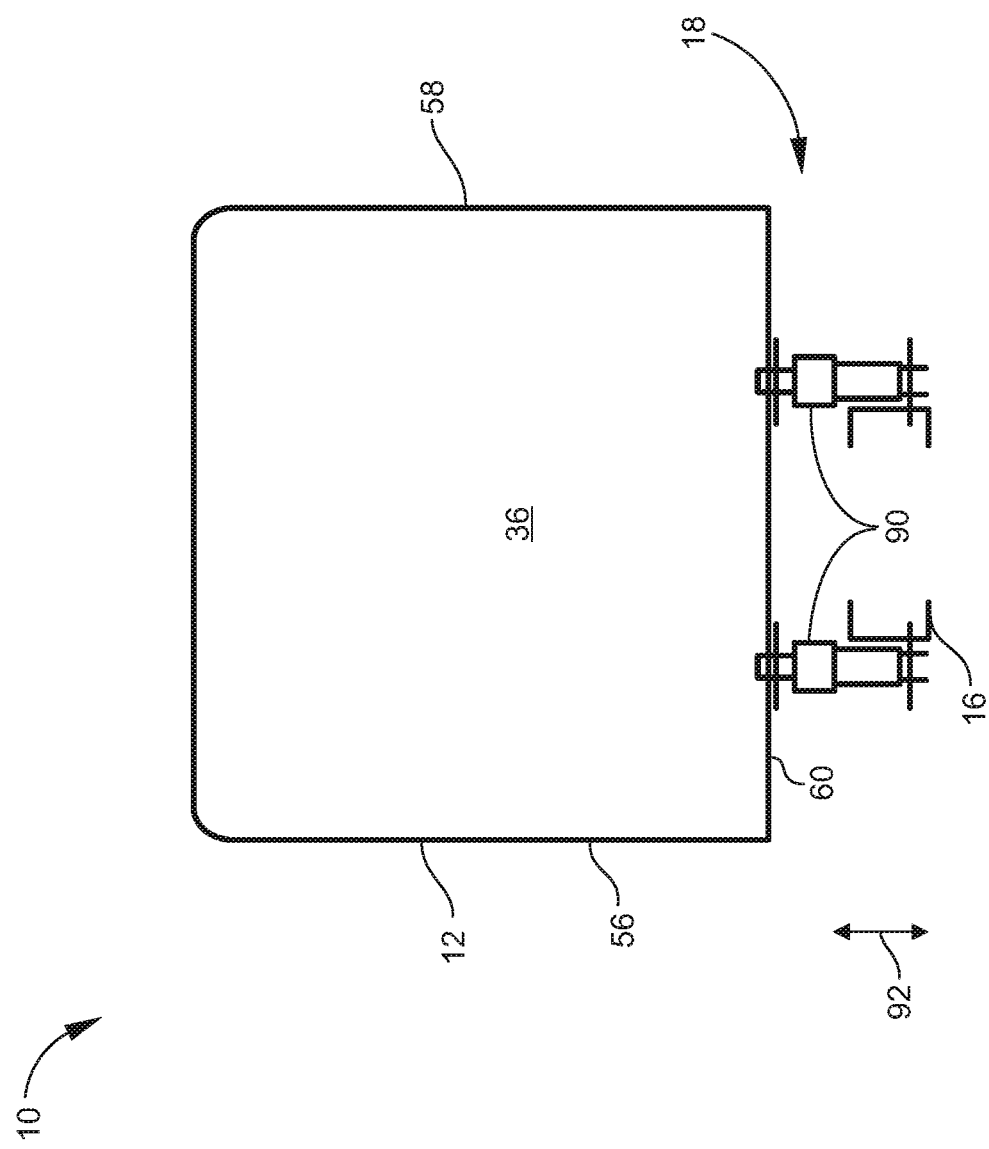

CAB AND HOOD SUSPENSION WITH HOOD TILT

FIELD OF THE DISCLOSURE

The present disclosure relates to cabs and hoods for semi-trailer trucks. More particularly, the instant disclosure relates to a cab and hood suspension with hood tilt for semi-trailer trucks.

BACKGROUND

Generally speaking, a semi-trailer truck, more commonly called a semi-truck, is the combination of a tractor unit and one or more semi-trailers to carry freight. It is also variously known in the United States as a semi, tractor-trailer, big rig, or eighteen-wheeler. A semi-trailer attaches to the tractor with a fifth wheel hitch, with much of its weight borne by the tractor. The result is that both tractor and semi-trailer will have a distinctly different design than a rigid truck and trailer.

The most common tractor-cab layout has a forward engine, one steering axle, and two drive axles. Ubiquitous in Europe, but less common in North America since the 1990s, is the cabover engine configuration, where the driver sits next to, or over the engine. With changes in the US to the maximum length of the combined vehicle, the cabover was largely phased out of North American over-the-road (long-haul) service by 2007. Cabovers were difficult to service, as the cab could not be lifted on its hinges to a full 90-degree forward tilt, severely limiting access to the front part of the engine. As such, the instant disclosure may be directed to a standard tractor with a conventional cab with a forward engine under a hood.

The cabin or cab of a truck is an enclosed space in a truck where the driver is seated. Modern long-haul truck cabs usually feature air conditioning, heater, a sound system, and ergonomic seats for driver and passenger comfort. A sleeper, also known as a sleeper berth or bunk, is a compartment attached to the back of the cab where the driver can rest while not driving, sometimes seen in semi-trailer trucks. Sleepers can range from a simple small bunk to a large sleeping area. Conventional cabs are the most common in North America, where the driver is seated behind the engine, as in most passenger cars or pickup trucks. Conventional cabs are further divided into large car and aerodynamic designs. A "large car" or "long nose" is a conventional truck with a long hood. With their very square shapes, these trucks experience a lot of wind resistance and typically consume more fuel. By contrast, aerodynamic cabs are very streamlined, with a sloped hood and other features to lower drag. The front doors are behind the front tires. Access to a conventional cabin is commonly by steps at or near the fuel tanks behind the front tires.

Truck cabs are ridged structures that need to be isolated from the chassis upon which they are mounted. This is done via a cab suspension system. Frames undergo bending and torsional movements due to the loads they carry, uneven road surfaces and the dynamic forces of maneuvering. These forces can damage and shorten the useful life of the cab. This isolation has typically been provided by elastomeric cab mount elements placed between the cab and frame. However, these cab mounts do not provide any enhancement in ride quality for the driver or passenger. This requires the cabs to be equipped with expensive ergonomic seats for driver and passenger comfort.

To improve the ride qualities of conventional style trucks, a cab suspension system has evolved which provides additional cab vertical excursion thereby lowering the vertical accelerations felt by the driver, thus improving the comfort level for the driver. This type of suspension system allows the cab to rotate about the front cab mounts and uses relatively soft springs at the rear of the cab to provide an increase in vertical movement of the cab relative to the frame. Although marginally successful this approach has major drawbacks. While providing beneficial vertical movement, to enhance comfort, the system also induces a pitch or fore and aft motion to the driver of similar magnitude. These fore and aft inputs are documented as being detrimental to human comfort (see ISO 2631).

In this type of cab suspension system, the movement of the cab is made difficult by the interface between the hood and cab. As such, design concessions must be made in the mounting of the hood to allow the movement of the mating cab structure. One current design mounts the hood rigidly to the frame at both the front and near the rear of the hood. Cab movement is limited by the clearance between the hood and cab. Large gaps between the hood and cab are required to allow this relative movement. Other design solutions allow the hood mounting to absorb the cab movements but do not provide for any vertical movement of the cab about the front attachment to the chassis.

Another issue with this cab suspension system is the length of the cab on current vehicles. This solution was designed before the advent of the longer integrated sleeper cabs allowed by the change in truck length regulations. Manufacturers use the same solution for both the shorter non-sleeper cab and the sleeper cab, which can be more than twice the length. This means the vertical travel at the driver's position is reduced by approximately 50% affecting the driver comfort.

Current tilt hood designs can be complicated solutions. These designs provide the function of allowing the hood to rotate about a point at the front and near the lower edge of the front face of the hood. The hood is typically mounted somewhere along this axis. Due to frame movements, designs incorporate different features to allow isolation of the hood from these frame movements. Separate components are sometimes included to allow movement of the hood relative to the cab when the two are coupled in the closed position. No current solution provides for a hood suspension system to allow isolation of the hood from road inputs. As such, the hood may be subjected to fatigue inducing vibrations which can reduce the life of the hood.

Cab suspension systems have been suggested that use suspension elements at the four corners of the cab. Springs with low springs rates allow for additional vertical travel of the complete cab. This solution can be used to improve the comfort for the occupants. Unfortunately, this approach also allows for a secondary pitch motion which consequently detracts for any improvement that might have been possible.

Therefore, a need clearly exists for a new design for the cab and hood of a semi-trailer truck that maintains or improves rider comfort while also reducing the problems associated with current cab and hood suspension systems and allowing hood tilt for easy access to the engine. The instant disclosure of a cab and hood suspension system with hood tilt is designed to address at least some aspects of the problems discussed above.

SUMMARY

Briefly described, in a possibly preferred embodiment, the present disclosure overcomes the above-mentioned disadvantages and meets the recognized need for such an apparatus or method by providing of a cab and hood suspension system with hood tilt. The cab and hood suspension system may generally include a cab suspension system, a hood suspension system, and a hood tilt system. The cab and hood suspension system with hood tilt may generally be designed to provide isolation of the cab from the chassis configured for rider comfort in the cab even for longer sleeper cabs, isolation of the hood from the chassis and road inputs, and compatible movement of the cab and the hood, all while still allowing the hood to tilt for access to the engine.

In one aspect, a cab and hood suspension system may include the cab suspension system and the hood suspension system. The cab suspension system may include supporting spring elements and cab linkage. The supporting spring elements in combination with the cab linkage may be configured to control movements of the cab relative to the chassis. The hood suspension system may include hood linkage configured to locate the hood relative to the chassis. Wherein, the hood linkage may be configured to match the movements of the cab linkage.

In select embodiments, the supporting spring elements of the cab suspension system may include front air springs and rear air springs. The front air springs may be located approximate a front of the cab. The rear air springs may be located approximate a rear of the cab. Wherein, the front air springs and the rear air springs may be located outboard and above the chassis under cab structural positions. In select embodiments, the front air springs may include two front air springs located approximate front corners of the cab, and the rear air springs may include two rear air springs located approximate rear corners of the cab.

Another feature of the instant cab and hood suspension system may be the inclusion of at least one common height control valve. In select embodiments, the cab suspension system may include a front common height control valve configured for controlling a height of the front air springs. The front common height control valve may be located approximate the front of the cab between the cab and the chassis. In other select embodiments, a rear common height control valve may be included that may be configured for controlling a height of the rear air springs. The rear common height control valve may be located approximate the rear of the cab between the cab and the chassis. Whereby, the combination of the front common height control valve and the rear common height control valve may be configured to keep the cab level and parallel to the chassis regardless of the loading of the cab.

Another feature of the instant cab and hood suspension system may be the inclusion of a pair of cab vertical structural extensions. The cab vertical structural extension may be rigid members that extend from the chassis. The cab linkage of the cab suspension system may be connected between the pair of cab vertical structural extensions and the cab. In select embodiments, the cab linkage may include four cab links between the cab vertical structural extensions and the cab. Two right cab links may be on a right side of the cab connected to a right cab vertical structural extension, and two left cab links may be on a left side of the cab connected to a left cab vertical structural extension. In select embodiments, the two right cab links may include a bottom right cab link and a top right cab link. The bottom right cab link may be approximately horizontal and may connect the right side of the cab approximate a bottom of the cab with the right cab vertical structural extension. The top right cab link may connect the right side of the cab near or above a vertical center of mass of the cab with the right cab vertical structural extension. The top right cab link may be horizontal or inclined. Likewise, the two left cab links may include a bottom left cab link and a top left cab link. The bottom left cab link may be approximately horizontal and may connect the left side of the cab approximate the bottom of the cab with the left cab vertical structural extension. The top left cab link may connect the left side of the cab near or above the vertical center of mass of the cab with the left cab vertical structural extension. The top left cab link may be horizontal or inclined.

In select embodiments, the left and right top cab links may be parallel and horizontal and provide a cab movement with a minimum pitch and a maximum vertical displacement. In these embodiments, the cab and hood suspension system may be used with rigidly mounted hoods.

In select other embodiments, the left and right top cab links may be focused at a hood tilt point to provide a cab articulation about the hood tilt point. These embodiments may provide a vertical cab displacement, a reduced pitch movement and the cab articulation compatible to a hood articulation about the hood tilt point.

In select other embodiments, the left and right top cab links may be focused at an instant center forward of the truck. These embodiments may provide an increased vertical cab displacement, a substantial pitch reduction, and a controlled hood to cab movement.

Another feature of the instant cab and hood suspension system may be the inclusion of a transverse torque rod. The transverse torque rod may be at a rear of the cab connected to the chassis. The transverse torque rod may be configured for maintaining a positive transverse location of the cab at all times. Included with the transverse torque rod may be at least two dampers located at the rear of the cab to control vertical motions.

The hood suspension system may include a pair of hood vertical structural extensions from the chassis. The hood linkage of the hood suspension system may be connected between the pair of hood vertical structural extensions and the hood. In select embodiments, the hood linkage may include four hood links between the hood vertical structural extensions and the hood. Two right hood links may be on a right side of the hood connected to a right hood vertical structural extension, and two left hood links may be on a left side of the hood connected to a left hood vertical structural extension. In select embodiments, the two right hood links may include a bottom right hood link and a top right hood link. The bottom right hood link may be approximately horizontal and may connect the right side of the hood approximate a bottom of the hood with the right hood vertical structural extension. The top right hood link may connect the right side of the hood near or above a vertical center of mass of the hood with the right hood vertical structural extension. The top right hood link may be horizontal or inclined. Likewise, the two left hood links may include a bottom left hood link and a top left hood link. The bottom left hood link may be approximately horizontal and may connect a left side of the bottom of the hood with the left hood vertical structural extension. The top left hood link may connect the left side of the hood near or above the vertical center of mass of the hood with the left hood vertical structural extension. The top left hood link may be horizontal or inclined.

One feature of the instant cab and hood suspension system may be that the hood links may be configured to match the movement of the cab, whereby the relative movement between the hood and the cab is approximately matched.

One feature of the instant hood suspension system may be that it can include hood support springs to support the mass of the hood, and hood dampers to control the motion.

In select embodiments, the cab and hood suspension system may include a hood tilt system. The hood tilt system may be provided by the hood linkage of the hood suspension system. Wherein, the four hood links of the hood suspension system may be configured to allow for tilting of the hood.

In select embodiments of the hood suspension system, hood support springs may be included that are configured to assist in tilting the hood in both opening and closing the hood. Wherein, the dampers of the hood suspension system may limit the velocity of the hood to prevent damage for both opening and closing the hood, and/or may be configured to limit the travel of the hood in a fully opened position.

In select embodiments, the hood tilt system may include a supporting structure configured to restrain the hood in a closed position. The supporting structure may be located at a lower front edge of the cab on each side.

In select embodiments, the hood tilt system may include latches configured to maintain the contact between the hood and the cab. The latches may be mechanical or elastomeric.

In another aspect, the instant disclosure embraces a cab suspension system. The cab suspension system may generally include supporting spring elements, and cab linkage. Wherein, the combination of the supporting spring elements and the cab linkage may be configured to control movement of the cab relative to the chassis. The cab suspension system may be any of the embodiments of the cab suspension system as shown and/or described herein.

In another aspect, the instant disclosure embraces a cab and hood suspension system with hood tilt. The cab and hood suspension system with hood tilt may generally include, the cab suspension system in any of the embodiments shown and/or described herein, the hood suspension system in any of the embodiments shown and/or described herein, and the hood tilt system in any of the embodiments shown and/or described herein.

The foregoing illustrative summary, as well as other exemplary objectives and/or advantages of the disclosure, and the manner in which the same are accomplished, may become more apparent to one skilled in the art from the prior Summary, and the following Brief Description of the Drawings, Detailed Description, and Claims when read in light of the accompanying Detailed Drawings.

BRIEF DESCRIPTION OF THE DRAWINGS

The present apparatuses, systems and methods will be better understood by reading the Detailed Description with reference to the accompanying drawings, which are not necessarily drawn to scale, and in which like reference numerals denote similar structure and refer to like elements throughout, and in which:

FIG. 4A schematically depicts a top view of a cab and hood suspension system according to select embodiments of the instant disclosure showing the position of the four air springs under the cab;

FIG. 10 schematically depicts a side view of the cab and hood suspension system according to select embodiments of the instant disclosure showing the location of the hood supports on the front lower edge of the cab on either side, with the hood restraining latches shown;

FIG. 11 schematically depicts the position of a transverse torque rod at the back of the cab connecting the cab to the chassis for select embodiments of the instant disclosure of the cab and hood suspension system, where the transverse torque rod maintains a positive transverse location of the cab at all times;

FIG. 12 schematically depicts the location of the cab suspension damping elements located at the rear of the cab and hood suspension system according to select embodiments of the instant disclosure, where the damping elements are shown at a position outboard of the frame.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Figure 1:
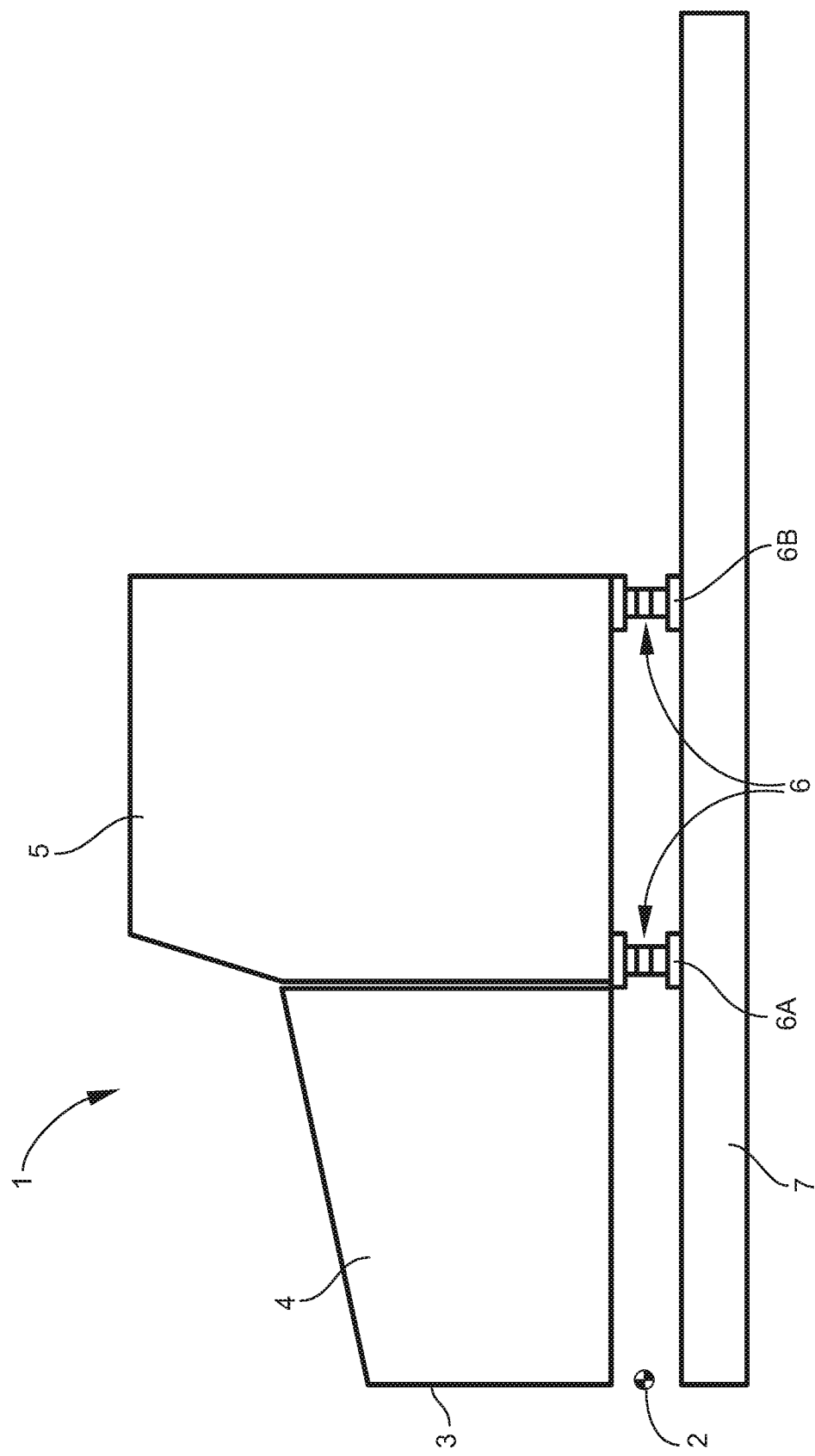
FIG. 1 schematically depicts a left side view of a class 8 conventional non-sleeper truck system according to the prior art.
Figure 2:
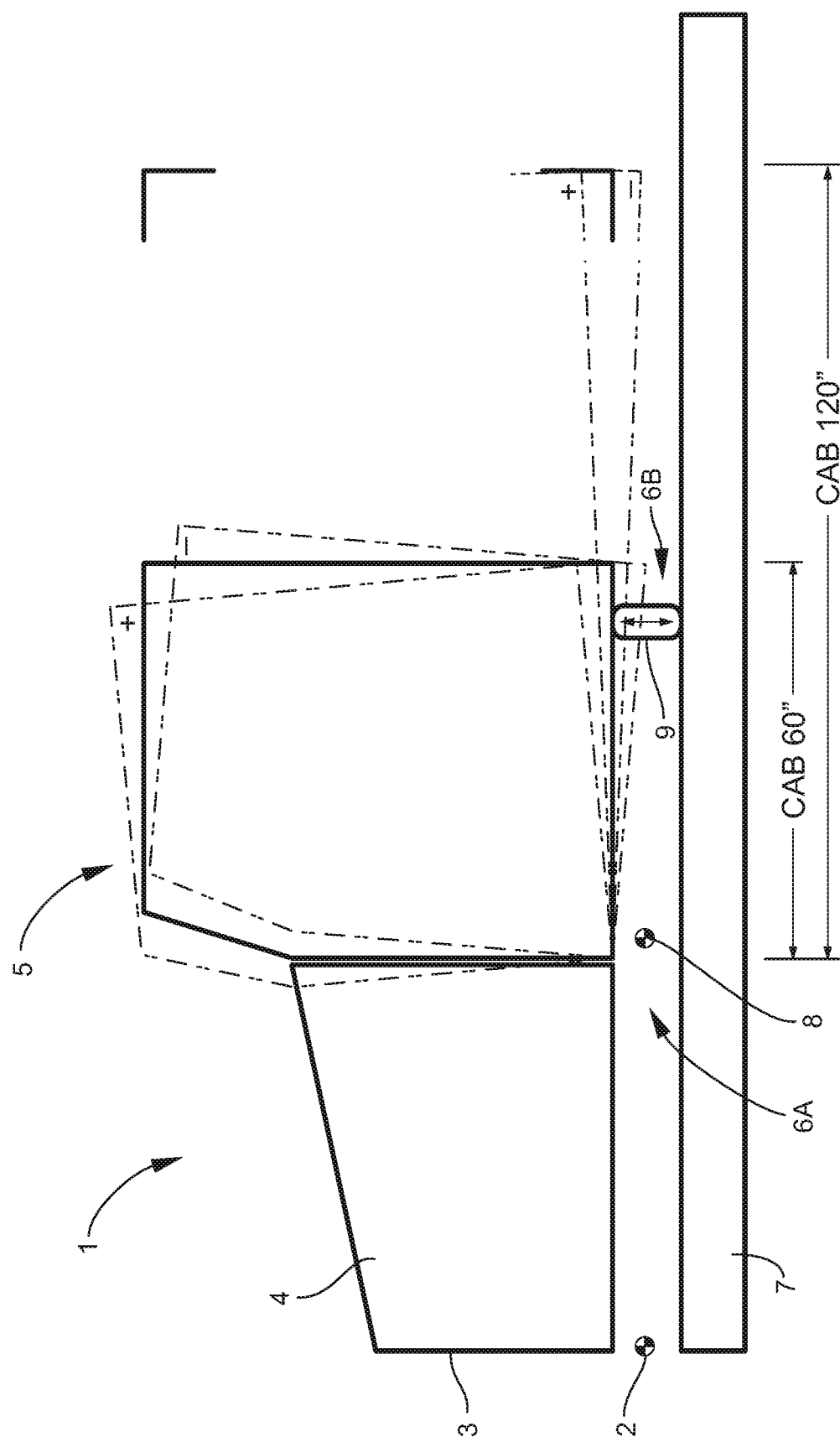
FIG. 2 schematically depicts a side view of a typical truck according to the prior art showing the current state of the art for cab suspensions, where the cab rotates about the front cab mounts that have small amounts of vertical movement.

Referring now to FIGS. 1-2, a conventional semi-trailer truck 1 with a cab 5, hood 4 and chassis 7 is shown. FIG. 1 schematically depicts a left side view of a class 8 conventional non-sleeper truck 1 according to the prior art. Typical hood and cab lengths are shown. The hood tilt point 2 is presented just below and at the front edge 3 of the hood 4. Elastomeric cab mounts 6 with small available deflection are located at the front and rear of the cab 5 between the cab 5 and chassis 7. As shown in FIG. 1, the hood 4 rests on the cab 5 in the closed position.

FIG. 2 is a view of a typical truck 1, according to the prior art, showing the current state of the art for cab suspensions. As shown, the cab 5 rotates about the front cab mounts 6A that have small amounts of vertical movement 9. The rear mounts 6B provide the vertical movement 9 to the cab by using springs with longer travel and softer spring rates. As shown in FIG. 2, longer sleeper cabs (e.g. 120 inches) use the same rear cab solution that now limits the vertical travel at the driver position because of the geometry presented by the longer cab. Hood 4 to cab 5 clearance issues are also demonstrated in FIG. 2.

As shown, to improve the ride qualities of conventional style trucks, the cab suspension system shown in FIGS. 1-2 has evolved which provides additional cab vertical excursion thereby lowering the vertical accelerations felt by the driver, thus improving the comfort level for the driver. This type of suspension system allows the cab to rotate about the front cab mount point 8 and uses relatively soft springs at the rear of the cab to provide an increase in vertical movement of the cab relative to the frame or chassis 7. Although marginally successful this approach has major drawbacks. While providing beneficial vertical movement, to enhance comfort, the system also induces a pitch or fore and aft motion to the driver of similar magnitude. These fore and aft inputs are documented as being detrimental to human comfort (see ISO 2631).

In this type of cab suspension system shown in FIGS. 1-2, the movement of the cab 5 is made difficult by the interface between the hood 4 and cab 5. As such, design concessions must be made in the mounting of the hood 4 to allow the movement of the mating cab 5 structure. One current design mounts the hood 4 rigidly to the frame at both the front 3 and near the rear of the hood 4. Cab 5 movement is limited by the clearance between the hood 4 and cab 5. As demonstrated in FIG. 2, large gaps between the hood 4 and cab 5 may be required to allow this relative movement. Other design solutions allow the hood 4 mounting to absorb the cab 5 movements but do not provide for any vertical movement of the cab 5 about the front attachment to the chassis.

Another issue with this cab suspension system shown in FIGS. 1-2 is the length of the cab 5 on current vehicles. This solution was designed before the advent of the longer integrated sleeper cabs allowed by the change in truck length regulations. Manufacturers use the same solution for both the shorter non-sleeper cab 5 (e.g. 60 inches) and the sleeper cab (e.g. 120 inches), which can be more than twice the length. This means the vertical travel at the driver's position is reduced by approximately 50%, thus, clearly affecting the driver comfort.

In addition, current tilt hood designs can be complicated solutions. These designs provide the function of allowing the hood to rotate about a point 2 at the front 3 and near the lower edge of the front face 3 of the hood 4. The hood 4 is typically mounted somewhere along this axis. Due to frame movements, designs incorporate different features to allow isolation of the hood 4 from these frame movements. Separate components are sometimes included to allow movement of the hood 4 relative to the cab 5 when the two are coupled in the closed position. No current solution provides for a hood 4 suspension system to allow isolation of the hood from road inputs. As such, the hood 4 may be subjected to fatigue inducing vibrations which can reduce the life of the hood.

Cab suspension systems have been suggested that use suspension elements at the four corners of the cab 5. Springs with low springs rates allow for additional vertical travel of the complete cab 5. This solution can be used to improve the comfort for the occupants. Unfortunately, this approach also allows for a secondary pitch motion which consequently detracts for any improvement that might have been possible.

Therefore, a need clearly exists for a new design for the cab 5 and hood 4 of semi-trailer truck 1 that maintains or improves rider comfort while also reducing the problems associated with current cab and hood suspension systems and allowing hood tilt for easy access to the engine. The instant disclosure of cab and hood suspension system 10 with hood tilt is designed to address at least some aspects of the problems discussed above.

Referring now to FIGS. 3-12, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 3-12, in a possibly preferred embodiment, the present disclosure overcomes the above-mentioned disadvantages and meets the recognized need for such an apparatus or method by providing of a cab and hood suspension system 10 with hood tilt. The cab and hood suspension system 10 may be designed for cab 12 and hood 14 of a truck with a chassis or frame 16. The cab and hood suspension system 10 may generally include a cab suspension system 18, a hood suspension system 26, and a hood tilt system 110. The cab and hood suspension system 10 with hood tilt may generally be designed to provide isolation of the cab 12 from the chassis 16 configured for rider comfort in the cab even for longer sleeper cabs 12, isolation of the hood 14 from the chassis 16 and road inputs, and compatible movement of the hood 14 and the cab 12, all while still allowing the hood to tilt for access to the engine.

The cab suspension system 18 may include supporting spring elements 20 and cab linkage 22. The supporting spring elements 20 in combination with the cab linkage 22 may be configured to control movements 24 of the cab 12 relative to the chassis 16. The hood suspension system 26 may include hood linkage 28 configured to locate the hood 14 relative to the chassis 16. Wherein, the hood linkage 28 may be configured to match the movements 24 of the cab linkage 22.

The supporting spring elements 20 of the cab suspension system 18 may include front air springs 30 and rear air springs 34. The front air springs 30 may be located approximate front 32 of the cab 12. The rear air springs 34 may be located approximate rear 36 of the cab 12. Wherein, the front air springs 30 and the rear air springs 34 may be located outboard and above the chassis 16 under cab structural positions 38. As shown in FIG. 4A, in select embodiments, the front air springs 30 may include two front air springs (30A and 30B) located approximate front corners 40 of the cab 12, and the rear air springs 34 may include two rear air springs (34A and 34B) located approximate rear corners 42 of the cab 12.

At least one common height control valve 44, 48 may be included in cab suspension system 18. See FIGS. 3 and 4. In select embodiments, the cab suspension system 18 may include front common height control valve 44 configured for controlling height 46 of the front air springs 30. The front common height control valve 44 may be located approximate the front 32 of the cab 12 between the cab 12 and the chassis 16. In other select embodiments, rear common height control valve 48 may be included that may be configured for controlling height 50 of the rear air springs 34. The rear common height control valve 48 may be located approximate the rear 36 of the cab 12 between the cab 12 and the chassis 16. Whereby, the combination of the front common height control valve 44 and the rear common height control valve 48 may be configured to keep the cab 12 level and parallel to the chassis 16 regardless of the loading of the cab 12.

Pair of cab vertical structural extensions 52 may also be included in cab suspension system 18. The cab vertical structural extension 52 may be rigid members that extend from the chassis 16. The cab linkage 22 of the cab suspension system 18 may be connected between the pair of cab vertical structural extensions 52 and the cab 12. In select embodiments, the cab linkage 22 may include four cab links 54 between the cab vertical structural extensions 52 and the cab 12. Two right cab links 54A, 54B may be on right side 56 of the cab 12 connected to right cab vertical structural extension 52A, and two left cab links 54C, 54D may be on left side 58 of the cab 12 connected to left cab vertical structural extension 52B. In select embodiments, the two right cab links may include bottom right cab link 54A and top right cab link 54B. The bottom right cab link 54A may be approximately horizontal and may connect the right side 56 of the cab 12 approximate bottom 60 of the cab 12 with the right cab vertical structural extension 52A. The top right cab link 54B may connect the right side 56 of the cab 12 near or above vertical center of mass 62 of the cab 12 with the right cab vertical structural extension 52A. The top right cab link 54B may be horizontal or inclined. Likewise, the two left cab links may include bottom left cab link 54C and top left cab link 54D. The bottom left cab link 54C may be approximately horizontal and may connect the left side 58 of the cab 12 approximate the bottom 60 of the cab 12 with the left cab vertical structural extension 52B. The top left cab link 54D may connect the left side 58 of the cab 12 near or above the vertical center of mass 62 of the cab 12 with the left cab vertical structural extension 52B. The top left cab link 54D may be horizontal or inclined.

Figure 3:
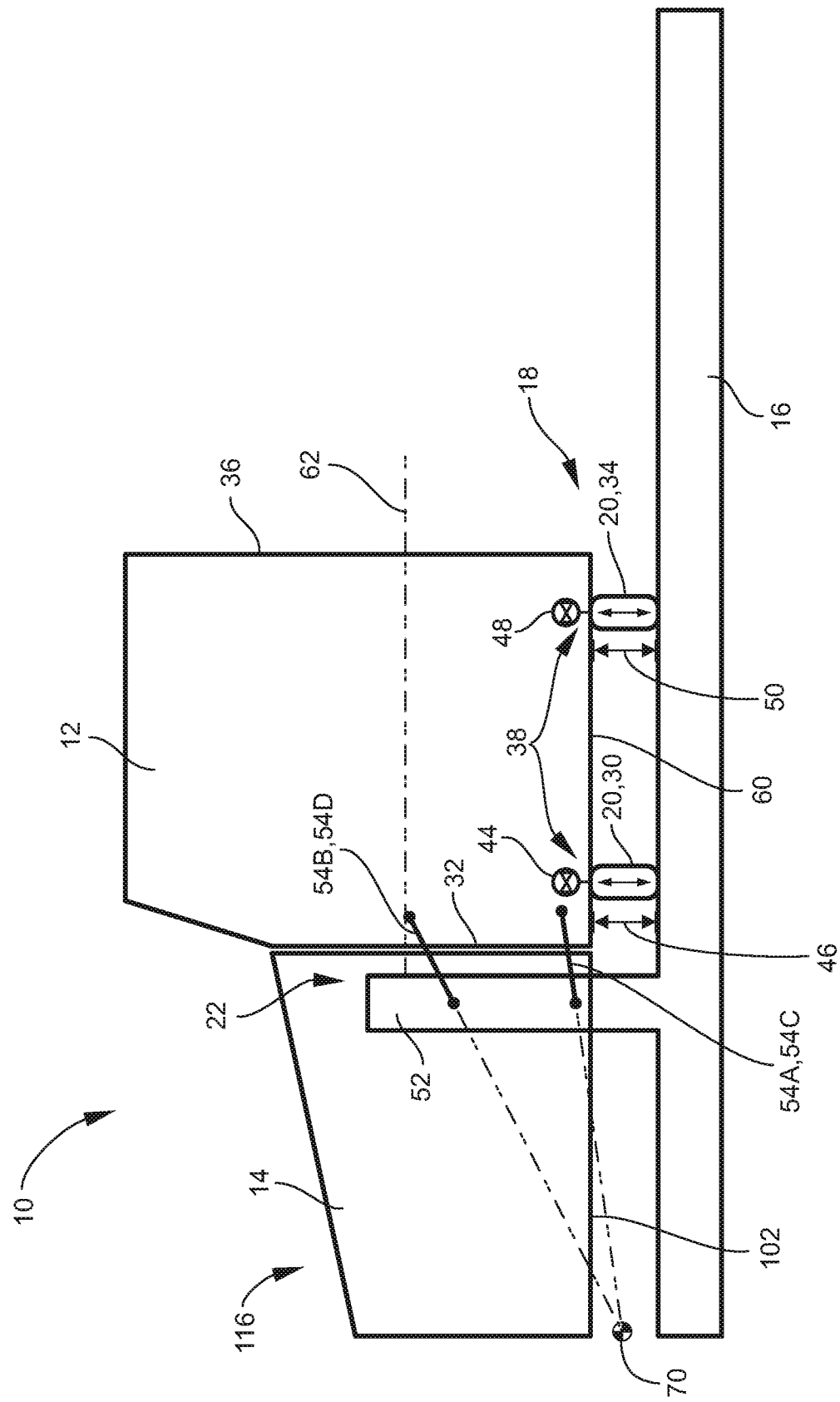
FIG. 3 schematically depicts a side view of a cab and hood suspension system according to select embodiments of the instant disclosure using four air springs and a focused link system that directs the cab to rotate about the tilt point of the hood.
Figure 7:
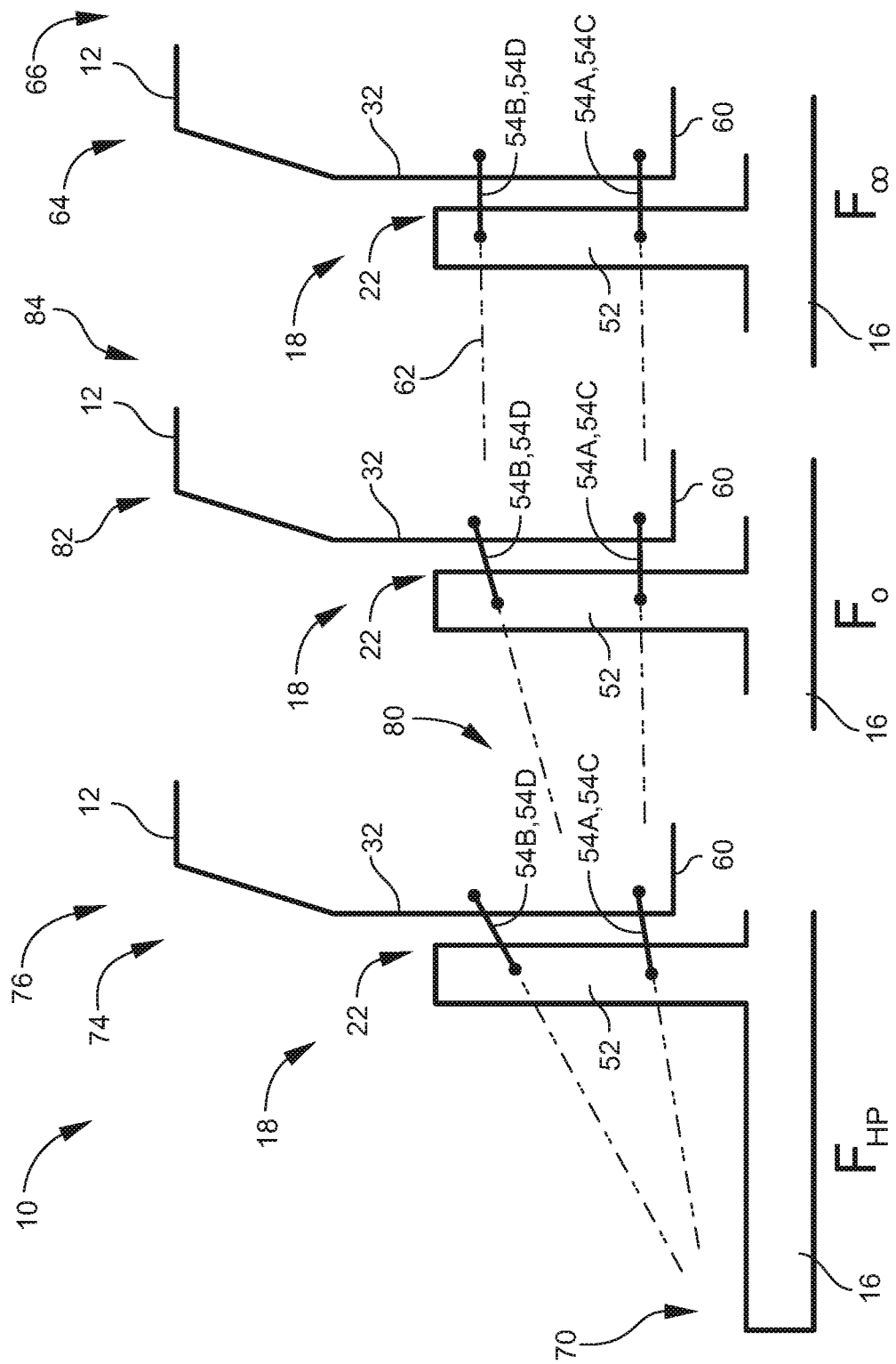
FIG. 7 schematically depicts three different side views of the linkage for the cab suspension according to select embodiments of the instant disclosure focused at different points: the first shows the cab suspension with the links focused at the hood tilt point; the second shows the links focused at a point located a distance in front of the vehicle, and the third shows the links focused at a point an infinite distance in front of the vehicle.

As shown in the right diagram of FIG. 7, in select embodiments, the left and right top cab links 54B, 54D may be parallel and horizontal and provide cab movement 24 with minimum pitch 64 and maximum vertical displacement 66. In these embodiments, the cab and hood suspension system 10 may be used with rigidly mounted hoods 68, as shown in FIGS. 3 and 4A.

As shown in the left diagram of FIG. 7 (and in FIG. 3), in select other embodiments, the left and right top cab links 54B, 54D may be focused at hood tilt point 70 to provide cab articulation 72 about the hood tilt point 70. These embodiments may provide vertical cab displacement 74, reduced pitch movement 76, and cab articulation 72 compatible to hood articulation 78 about the hood tilt point 70.

As shown in the middle diagram of FIG. 7 (and in FIGS. 4, 4C, and 4E), in select other embodiments, the left and right top cab links 54B, 54D may be focused at an instant center 80 forward of the truck. These embodiments may provide increased vertical cab displacement 82, substantial pitch reduction 84, and controlled hood to cab movement 86.

Transverse torque rod 88 may be included with cab suspension system 18. See FIG. 11. The transverse torque rod 88 may be at rear 36 of the cab 12 connected to the chassis 16. The transverse torque rod 88 may be configured for maintaining a positive transverse location of the cab at all times. As shown in FIG. 12, included with the transverse torque rod 88 may be at least two dampers 90 located at the rear 36 of the cab to control vertical motions 92.

Pair of hood vertical structural extensions 94 may be included with hood suspension system 26. Hood vertical structural extensions 94 may be rigid from the chassis 16. The hood linkage 28 of the hood suspension system 26 may be connected between the pair of hood vertical structural extensions 94 and the hood 14. In select embodiments, the hood linkage 28 may include four hood links 96 between the hood vertical structural extensions 94 and the hood 14. Two right hood links 96A, 96B may be on right side 98 of the hood 14 connected to right hood vertical structural extension 94A, and two left hood links 96C, 96C may be on left side 100 of the hood 14 connected to left hood vertical structural extension 94B. In select embodiments, the two right hood links may include bottom right hood link 96A and top right hood link 96B. The bottom right hood link 96A may be approximately horizontal and may connect the right side 98 of the hood 14 approximate bottom 102 of the hood 14 with the right hood vertical structural extension 94A. The top right hood link 96B may connect the right side 98 of the hood 14 near or above vertical center of mass 104 of the hood 14 with the right hood vertical structural extension 94A. The top right hood link 96B may be horizontal or inclined. Likewise, the two left hood links may include bottom left hood link 96C and top left hood link 96D. The bottom left hood link 96C may be approximately horizontal and may connect left side 100 of the bottom 102 of the hood 14 with the left hood vertical structural extension 94B. The top left hood link 96D may connect the left side 100 of the hood 14 near or above the vertical center of mass 104 of the hood 14 with the left hood vertical structural extension 94B. The top left hood link 96D may be horizontal or inclined.

One feature of the instant cab and hood suspension system 10 may be that the hood links 96A, 96B, 96C, 96D may be configured to match the movement of the cab 12 (via cab links 54A, 54B, 54C, 54D), whereby the relative movement between the hood 14 and the cab 12 is approximately matched.

Hood support springs 106 and hood dampers 108 may be included with hood suspension system 26. See FIG. 6. Hood support springs 106 may be included to support the mass of the hood 14. Hood dampers 108 may also be included to control the motion of hood 14.

Hood tilt system 110 may be included with cab and hood suspension system 10 for providing the hood tilt. See FIGS. 5-6. The hood tilt system 110 may be provided by the hood linkage 28 of the hood suspension system. Wherein, the four hood links 96A, 96B, 96C, 96D of the hood suspension system 26 may be configured to allow for tilting of the hood 14. Hood support springs 106 and dampers 108 may be included that are configured to assist in tilting the hood 14 in both opening and closing the hood 14. Wherein, the dampers 108 of the hood suspension system 26 may limit the velocity of the hood 14 to prevent damage for both opening and closing the hood, and/or may be configured to limit the travel of the hood 14 in a fully opened position 112. Referring to FIG. 10, supporting structure 114 may be configured to restrain the hood 14 in closed position 116. The supporting structure 114 may be located at lower front edge 118 of the cab 12 on each side. Still referring to FIG. 10, latches 120 may be included and configured to maintain the contact between the hood 14 and the cab 12. The latches 120 may be mechanical or elastomeric.

Referring to FIG. 3, cab and hood suspension system 10 is shown using four air springs 20 and cab linkage 22 that is focused to rotate the cab 12 about the tilt point 70 of the hood 14. This embodiment of system 10 can be used-on trucks with their existing tilt hood mounting, as hood 14 to cab 12 clearance requirements may be reduced to minimum values.

Figure 4:
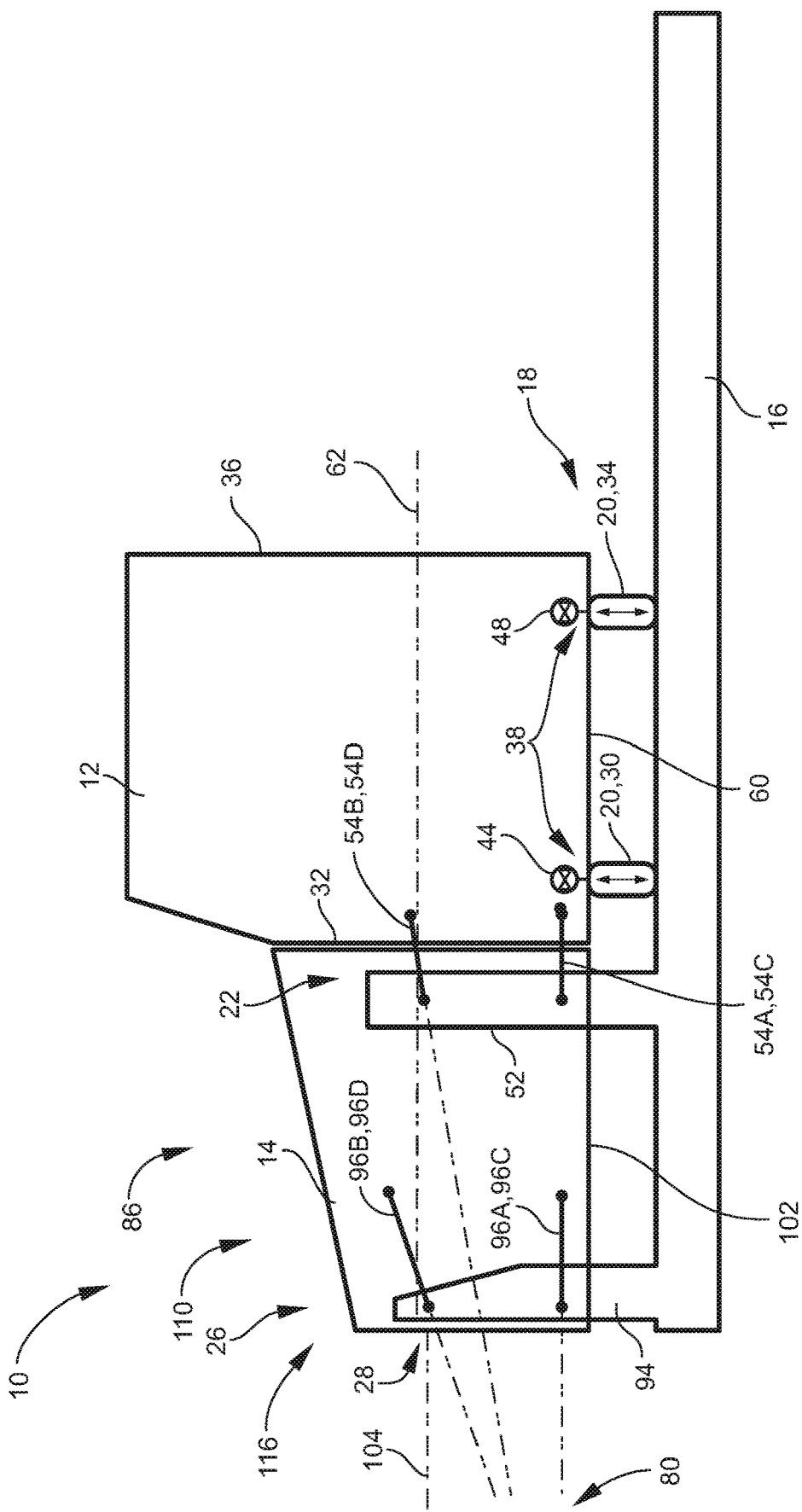
FIG. 4 schematically depicts a side view of a cab and hood suspension system according to select embodiments using four air springs on the cab and a focused link system that directs the cab to rotate about an instant center located at a point in front of the vehicle, in addition a hood suspension system is shown that uses four links to direct the hood to rotate about the same instant center as the cab.

Referring to FIG. 4, cab and hood suspension system 10 is shown using four air springs 20 and cab linkage 22 and hood linkage 28 focusing the cab 12 and the hood 14 to rotate about an instant center 80 located at a point in front of the vehicle. The cab suspension system 18 and the hood suspension system 26 each use four links to direct the cab and hood to rotate about the same instant center 80, whereby hood 14 to cab 12 relative movement is reduced from previous solutions.

Referring to FIG. 4A, a plan view of the location of the four air springs 30A, 30B, 30C, and 30D is shown. As shown, they are located outboard of the frame or chassis 16 and under cab structural elements 38. Two springs 30A, 30B are located at the front 32 of the cab 12 and two springs 30C, 30D at the rear 36 of the cab 12. The springs 30A, 30B, 30C, 30D support the cab 12 over the frame 16.

Figure 4B:
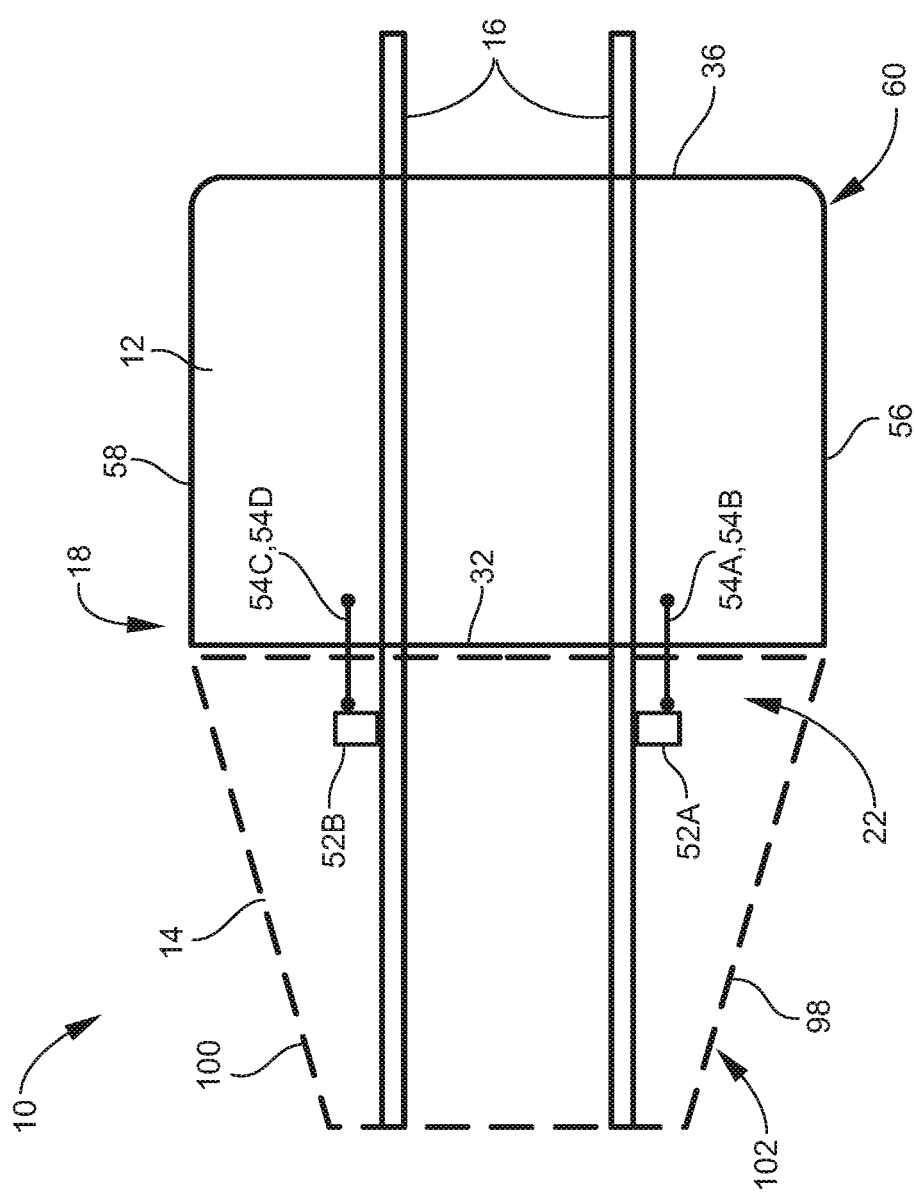
FIG. 4B schematically depicts a top view of a cab and hood suspension system according to select embodiments of the instant disclosure showing the location of the links locating the cab on the frame extensions.

Referring to FIG. 4B, a plan view of the location of the four cab links 54A, 54B, 54C, 54D locating the cab 12 on the cab frame extensions 52A and 52B is shown.

Figure 4C:
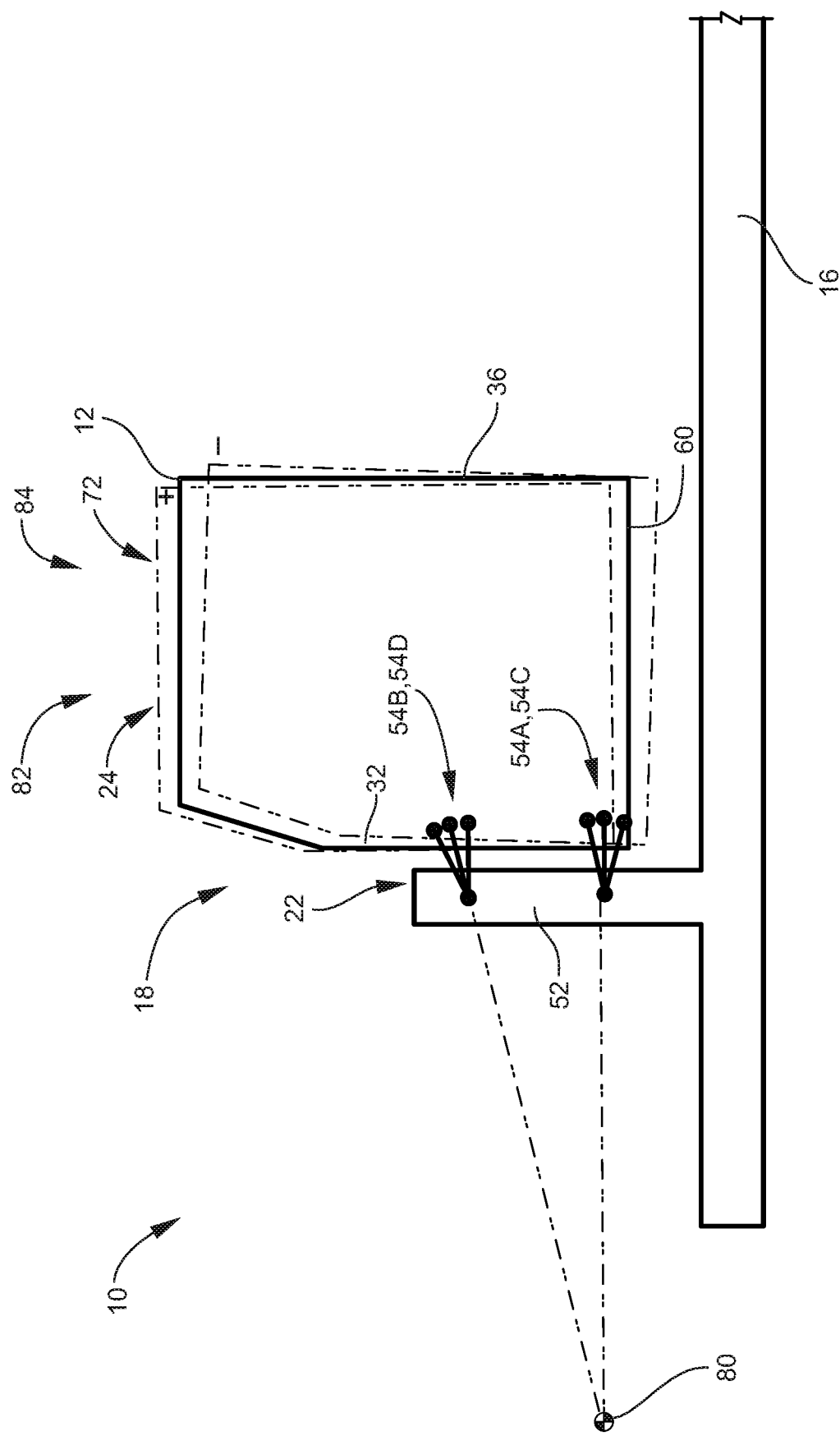
FIG. 4C schematically depicts a side view of the articulation of the cab rotating about the linkage with the instant center located in front of the vehicle according to select embodiments of the instant disclosure.

Referring to FIG. 4C, a diagram depicting the articulation 72 of the cab 12 about the chassis 16 with the instant center 80 located in front of the vehicle is shown. This shows the increased vertical travel of the cab 12 at the front 32 of the cab 12. A substantial pitch reduction 84 is evident in this view.

Figure 4D:
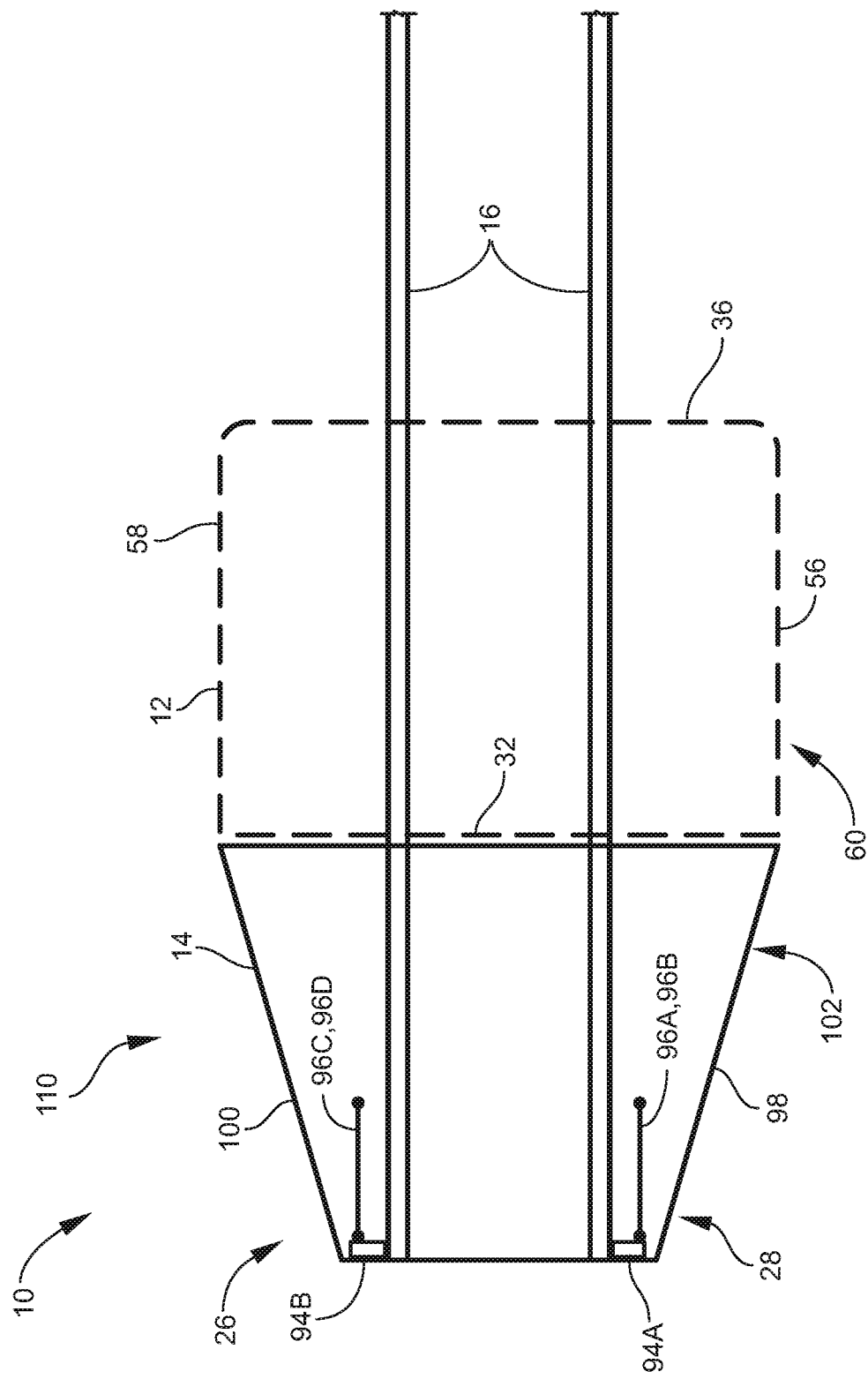
FIG. 4D schematically depicts a top view of a cab and hood suspension system according to select embodiments of the instant disclosure showing the location of the hood locating links with the forward end attached to frame extensions and the rear attached to the hood.

Referring to FIG. 4D, a diagram depicting the location of the four hood links 96A, 96B, 96C, 96D with the forward end attached to hood frame extensions 94A, 94B and the rear attached to the hood 14.

Figure 4E:
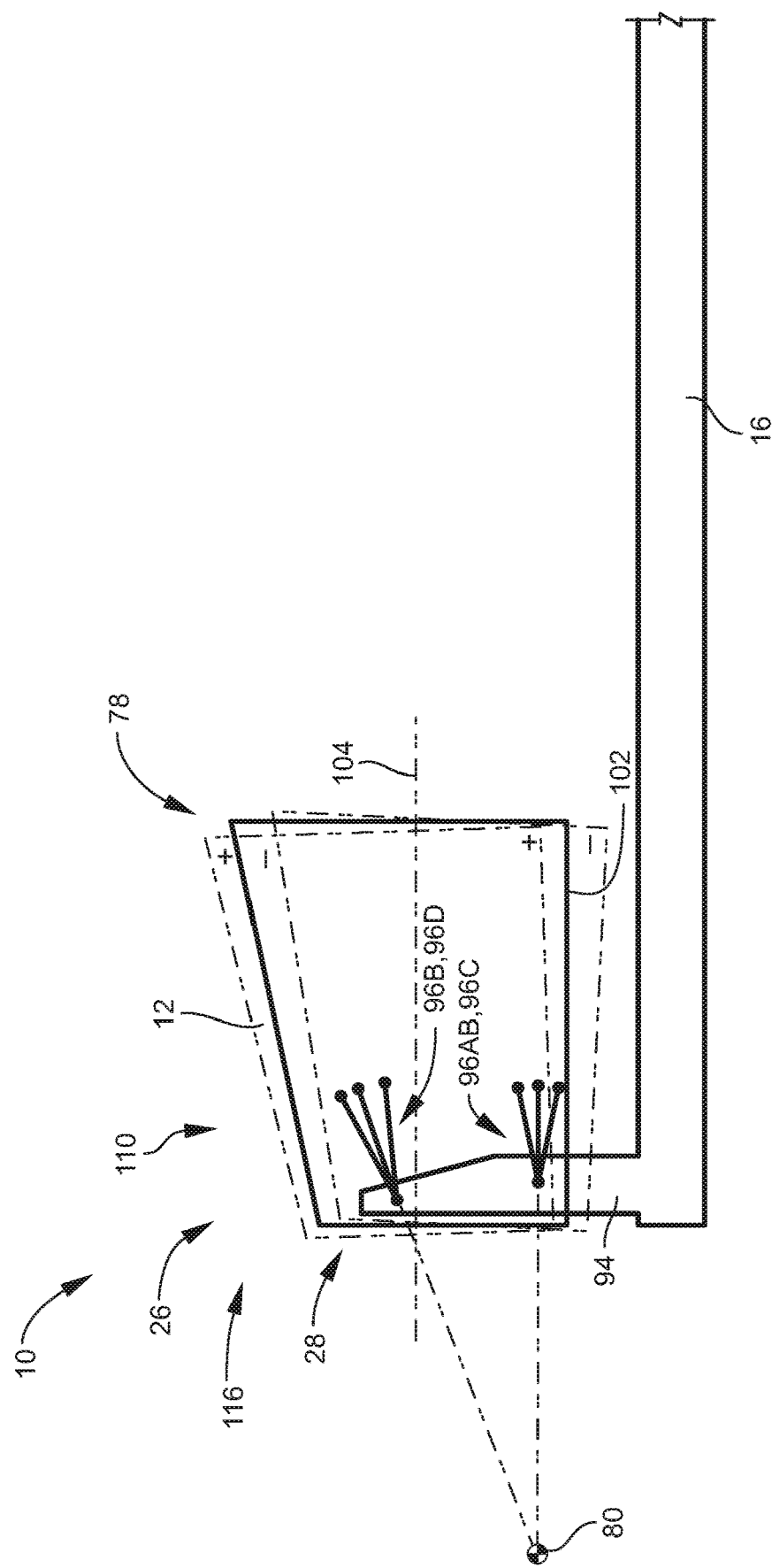
FIG. 4E schematically depicts a side view of the articulation of the hood rotating about the linkage with the instant center in front of the vehicle.

Referring to FIG. 4E, a diagram showing the articulation of the hood suspension system 26 about the instant center 80 in front of the vehicle is shown.

Figure 5:
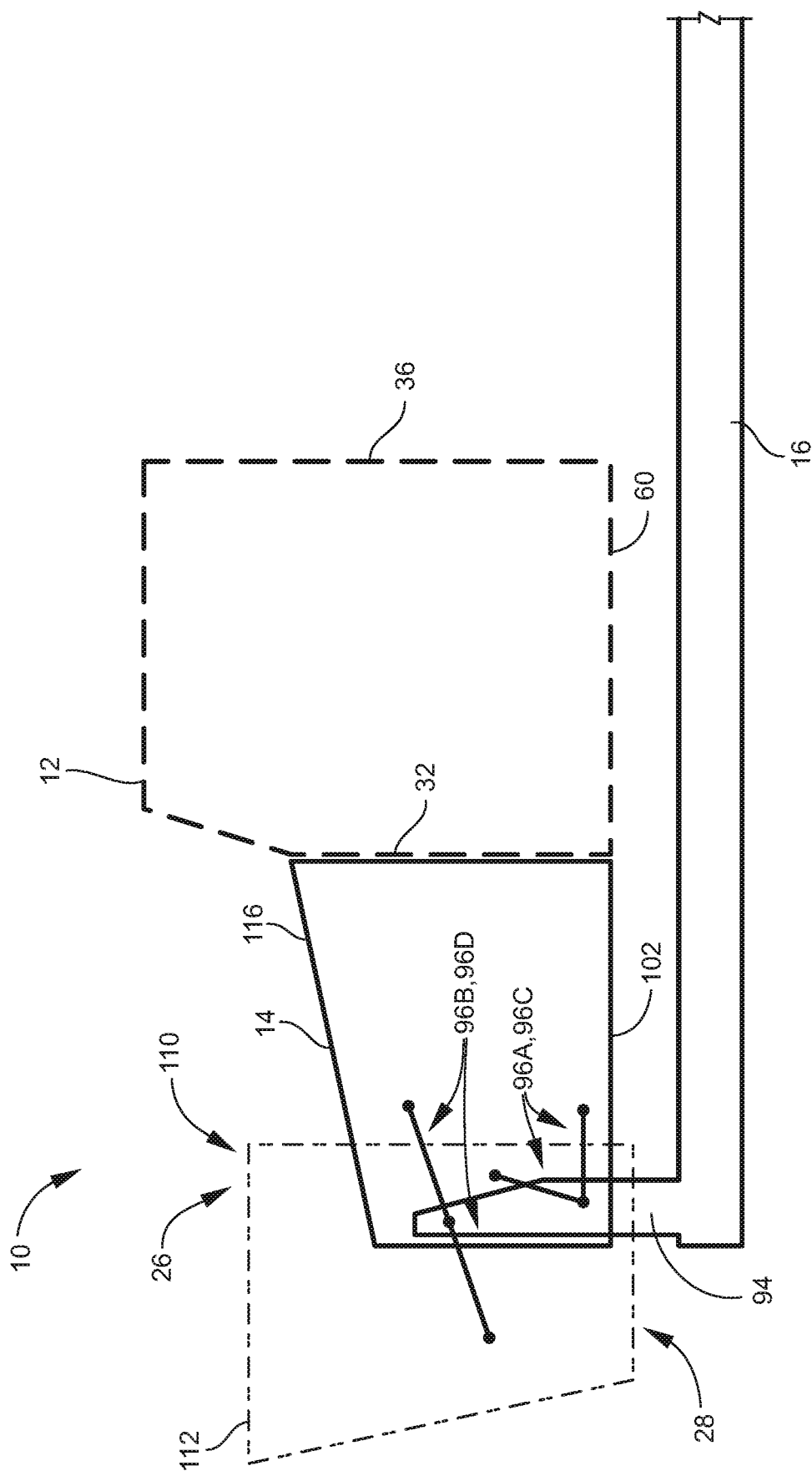
FIG. 5 schematically depicts a side view of the hood rotating about the linkage for the hood tilt according to select embodiments of the instant disclosure.

Referring to FIG. 5, a diagram showing the function of the hood links 96A, 96*b*, 96C, 96D in providing the hood tilting function is shown. The closed position 116 and open position 112 are indicated. As such, a 90 degree tilt is shown.

Figure 6:
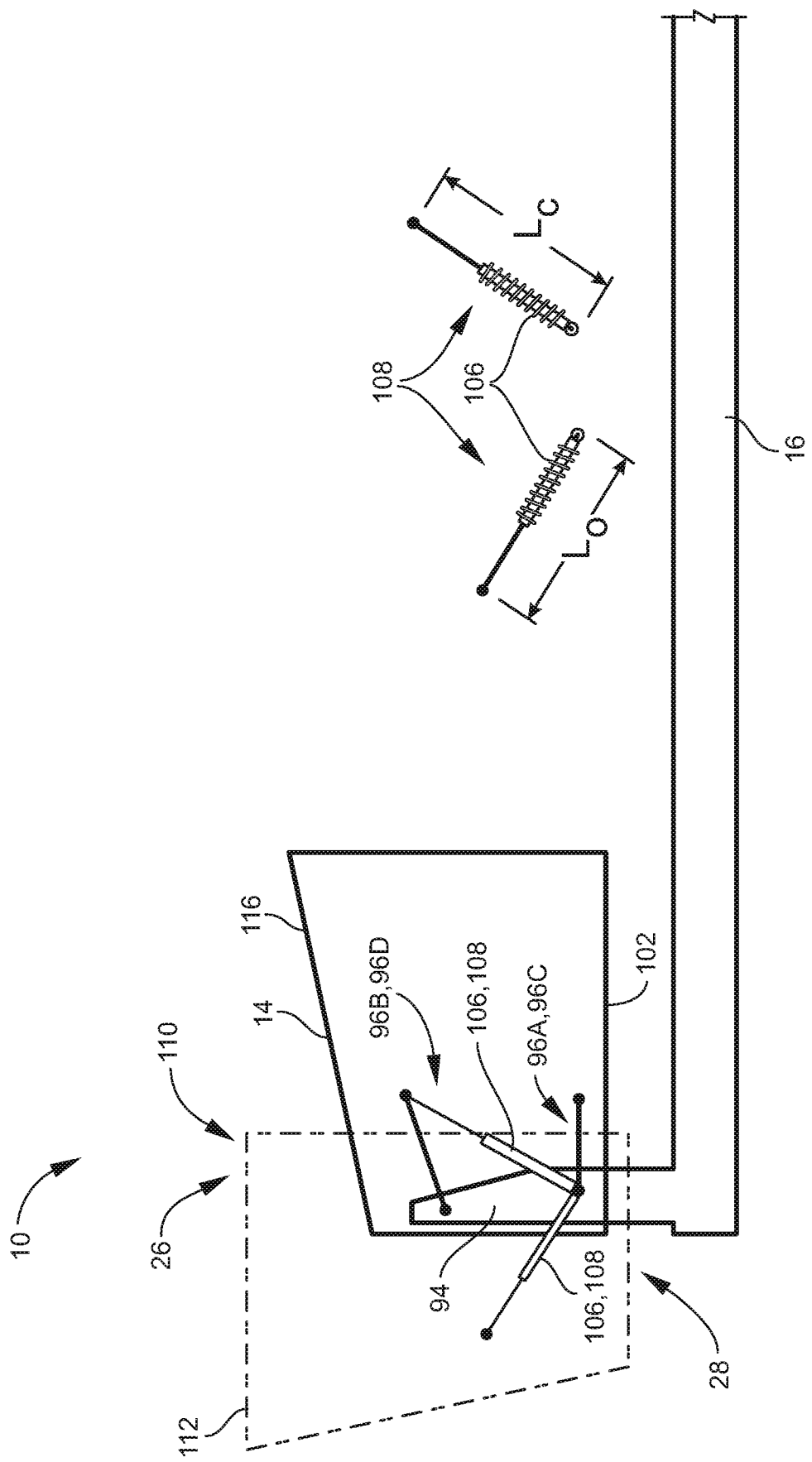
FIG. 6 schematically depicts a side view of the hood rotating about the linkage for the hood tilt according to select embodiments of the instant disclosure with a hood support spring shown coaxial with the damper that are attached to the frame at their bottom and attached to the hood at their top.

Referring to FIG. 6, the hood support springs 106 are shown coaxial with the dampers 108. These are attached to the frame 16 at their bottom and attached to the hood 13 at their top. The collapsed length of the damper 108 in the open hood position 112 provides the mechanical stop to hold the hood 14 in this open position 112. Using two dampers 108 provides a back up for this function in case of a failure.

Referring to FIG. 7, three different cab suspension systems 10 are shown that can be created using the four cab links 54A, 54B, 54C, 54D focused at different points. The first shows the links focused at the hood tilt point 70. Some current production trucks could adopt this solution and still use their existing hood tilt arrangement. The second view shows the previously discussed cab suspension focused at a point 80 in front of the vehicle. This solution may be compatible with the hood suspension discussed previously. The third solution can be applied to current conventional trucks that have an independently mounted hood 14 that does not interface or move with the cab 12.

Figure 8:
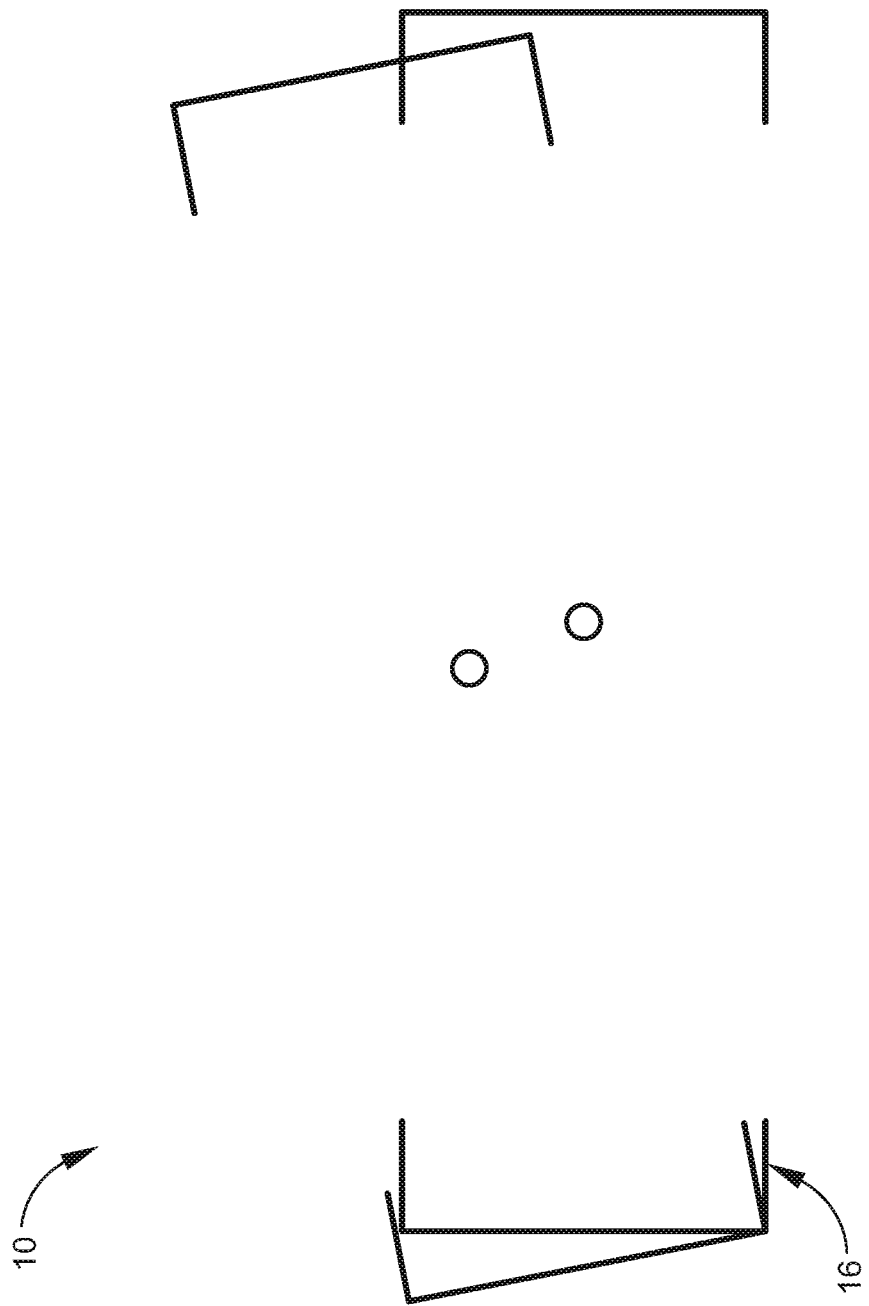
FIG. 8 schematically depicts the torsional deformation of a truck frame viewed from the rear of the cab and hood suspension system according to select embodiments of the instant disclosure.

Referring to FIG. 8, a sketch of the torsional deformation of a truck frame 16 viewed from the rear is shown. The cab and hood suspension 10 disclosed herein may provide a way to isolate these cab 12 and hood 14 assemblies from this movement.

Figure 9:
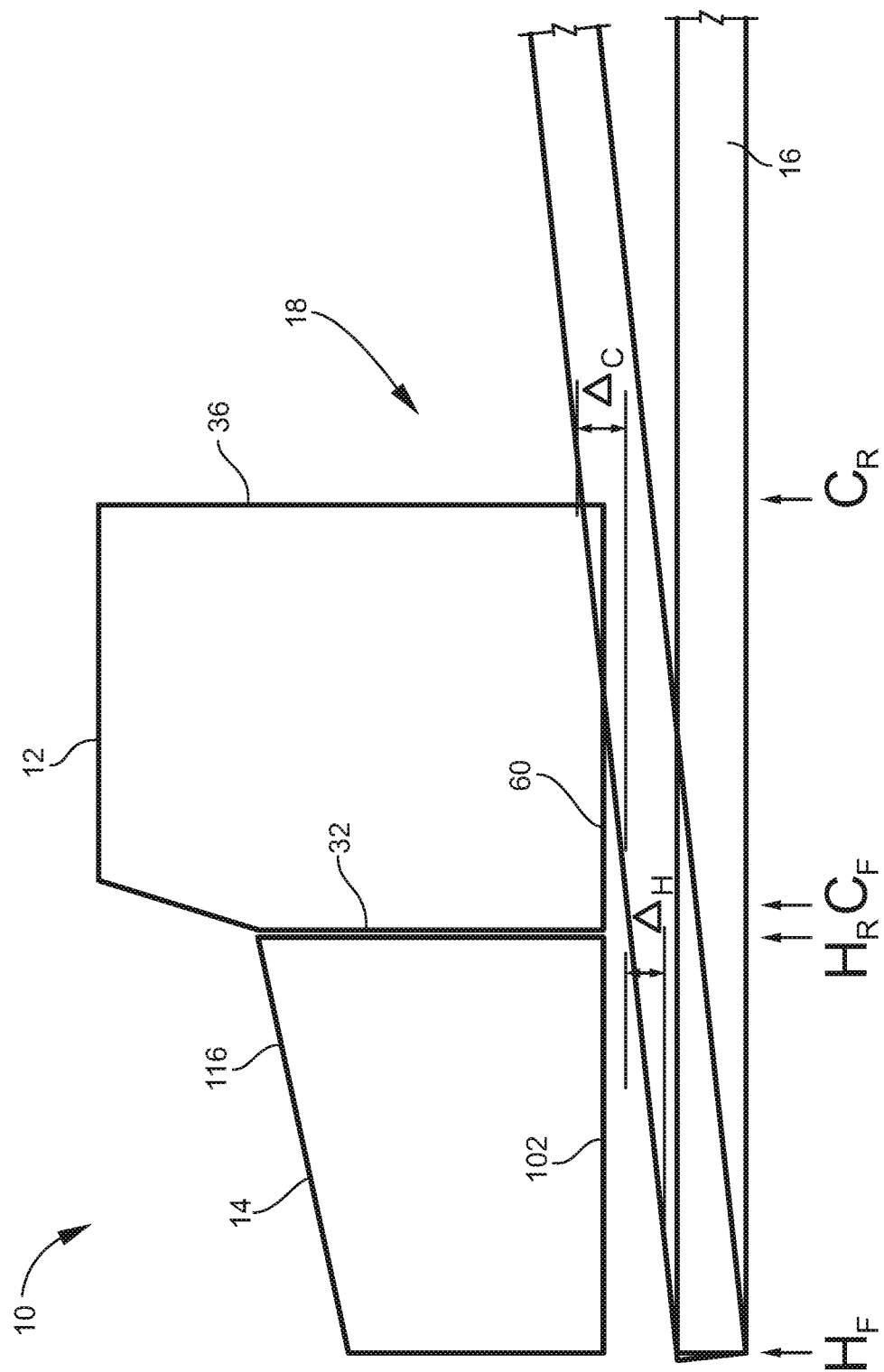
FIG. 9 schematically depicts a side view of torsional movement of the frame of the cab and hood suspension system according to select embodiments of the instant disclosure.

Referring to FIG. 9, a side view of frame torsional movement is shown. This is meant to show the difficulties encountered with today's designs that attach the hood 14 or cab 12 rigidly to the frame.

Referring to FIG. 10, a view showing the location of the hood support structure 114 on the front lower edge 118 of the cab 12 on either side is shown. The hood restraining latches 120 are also shown in an approximate location.

Referring to FIG. 11, a sketch depicting the position of transverse torque rod 88 is shown at the back 36 of the cab 12 connecting the cab 12 to the chassis 16. This transverse torque rod 88 may maintain a positive transverse location of the cab at all times.

Referring to FIG. 12, a sketch depicting the location of the cab suspension damping elements 90 located at the rear 36 of the cab 12 are shown. Dampers 90 are shown at a position outboard of the frame 16.

The instant cab and hood suspension system 10 with hood tilt may thus be comprised of three major systems that function together. Cab suspension system 18, hood suspension system 26, and hood tilt system 110. In the cab suspension system 18, the supporting spring elements 20 may be air springs 30, 34 located at the front 32 and rear of the cab 12, respectively. Two front springs 30A, 30B at the front 32 and two rear air springs 34A, 34B at the rear 36 of the cab 12. The air springs 30, 34 may be located outboard and above the frame 16 under cab structural positions 38. The height 46 of the forward two air springs 30 may be controlled by front common height control valve 44 located approximate the front 32 of the cab 12 between the cab 12 and chassis 16. The two rear air springs 34 would similarly have rear common height control valve 48 located approximate the rear 36 of the cab 12 between the cab 12 and chassis 16. However, the disclosure is not so limited, and any number of control valves could be incorporated for supporting springs 20. This provides a mechanism to keep the cab 12 level and parallel to the frame 16 regardless of the loading of the cab 12, e.g., driver, passenger, luggage, tools, etc. The fore and aft control of the cab 12 relative to the chassis may be provided by four cab links 54. The cab links 54 may be primarily horizontal connecting the front 32 of the cab 12 to cab vertical structural extensions 52 from the frame 16. Two cab links 54C, 54D may be located on the left side 58 of cab 12 with the other two cab links 54A, 54B located on the right side 56 of cab 12. The lower cab links 54A, 54C may be primarily horizontal and may be attached approximate the bottom 60 of the cab 12 structure extending forward. The upper cab links 54B, 54D may attach to the cab 12 near or above the vertical center of mass 62 of the cab 12 assembly and extend forward and connect to the vertical frame extensions 52. The upper cab links 54B, 54D can be horizontal or inclined to provide the cab articulation 72 for the intended design purpose. These designs solutions can be:

1) The upper cab links 54B, 54D can be parallel and horizontal and provide cab movement 24 with minimum pitch 64 and maximum vertical displacement 66. See left diagram of FIG. 7. This solution can be compatible with rigidly mounted hoods 68.
2) The upper cab links 54B, 54D can be "focused" at the hood tilt point 70 to provide cab articulation 72 about this point 70 providing vertical cab displacement 74, reduced pitch movement 76, and cab articulation 72 compatible to hood articulation 78 about its tilt point 70. See right diagram of FIG. 7.
3) The upper cab links 54B, 54D can be "focused" at an instant center 80 forward of the vehicle that provides cab articulation 72 compatible with hood suspension system 26. See middle diagram of FIG. 7. This solution provides increased vertical cab displacement 82, substantial pitch reduction 84, and controlled hood to cab movement 86.

Additional control of the cab 12 could be provided by transverse torque rod 88 at the rear 36 of the cab 12. See FIG. 11. Transverse torque rod 88 may be connected to the frame or chassis 16 and at least two dampers 90 located at the rear 36 of the cab 12 to control vertical motions 92. See FIG. 12

The second system of the instant cab and hood suspension system 10 with hood tilt may be hood suspension system 26. Four hood links 96A, 96B, 96C, 96D locate the hood 14 relative to the chassis 16. As such, hood suspension system 26 may be similar to the cab suspension system 18. As an example, these hood links 96 may be both focused to the same instant center 80 as described in design #3 above, allowing compatible articulation of the hood 14 and the cab 12. The relative movement between the hood 14 and the cab 12 may thus be reduced to a minimum. This hood suspension system 26 may also include springs 106 to support the mass of the hood 14 and dampers 108 to control the motion. See FIG. 6.

The third system of the instant cab and hood suspension system 10 with hood tilt is the hood tilt system 110 that provides the tilt functionality for hood 14. The four hood links 96 of the hood suspension system 26 thus also provide the locating elements for tilting the hood 14. In the tilting mode, the hood support springs 106 may now provide the tilt effort assist function in both opening and closing the hood 14. In the tilting mode, the dampers 108 may limit the velocity of the hood 14 to prevent damage for both opening and closing. The dampers 108 may also provide the travel limiting device when the hood is fully opened 112. The hood 14 may be restrained in the closed position 116 by supporting structure 114 that can be located at the lower front edge 118 of the cab 12 on each side. Mechanical or elastomeric latches 120 may maintain the contact between the hood 14 and the cab 12.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

The invention claimed is:

1. A cab and hood suspension system for a cab and a hood of a truck with a chassis, said cab and hood suspension system comprising:
    a cab suspension system including supporting spring elements and cab linkage configured to control movements of the cab relative to the chassis; and
    a hood suspension system including hood linkage configured to locate the hood relative to the chassis;
    the cab suspension system and hood suspension system being focused at an instant center forward of the truck, wherein the hood linkage is configured to match the movements of the cab linkage.

2. The cab and hood suspension system of claim 1, wherein the supporting spring elements of the cab suspension system comprising:
    front air springs located approximate a front of the cab; and
    rear air springs located approximate a rear of the cab;
    wherein, the front air springs and the rear air springs are located outboard and above the chassis under cab structural positions.

3. The cab and hood suspension system of claim 2, wherein:
    the front air springs including two front air springs located approximate front corners of the cab; and
    the rear air springs including two rear air springs located approximate rear corners of the cab.

4. The cab and hood suspension system of claim 2, wherein the cab suspension system further including:
    a front common height control valve configured for controlling a height of the front air springs, the front common height control valve is located approximate the front of the cab between the cab and the chassis; and
    a rear common height control valve configured for controlling a height of the rear air springs, the rear common height control valve is located approximate the rear of the cab between the cab and the chassis;
    whereby, the front common height control valve in combination with the rear common height control valve are configured to keep the cab level and parallel to the chassis regardless of the loading of the cab.

5. The cab and hood suspension system of claim 1, wherein the cab suspension system including:
    a pair of cab vertical structural extensions from the chassis;

the cab linkage of the cab suspension system is connected between the pair of cab vertical structural extensions and the cab;

wherein the cab linkage including four cab links between the cab vertical structural extensions and the cab, two right cab links on a right side of the cab connected to a right cab vertical structural extension, and two left cab links on a left side of the cab connected to a left cab vertical structural extension;

wherein:
the two right cab links include:
a bottom right cab link that is approximately horizontal and connects the right side of the cab approximate a bottom of the cab with the right cab vertical structural extension;
a top right cab link that connects the right side of the cab near or above a vertical center of mass of the cab with the right cab vertical structural extension, the top right cab link is horizontal or inclined;
the two left cab links include:
a bottom left cab link that is approximately horizontal and connects the left side of the cab approximate the bottom of the cab with the left cab vertical structural extension;
a top left cab link that connects the left side of the cab near or above the vertical center of mass of the cab with the left cab vertical structural extension, the top left cab link is horizontal or inclined.

6. The cab and hood suspension system of claim 5, wherein the left and right top cab links are parallel and horizontal and provide a cab movement with a minimum pitch and a maximum vertical displacement, wherein the cab and hood suspension system is used with rigidly mounted hoods.

7. The cab and hood suspension system of claim 5, wherein the left and right top cab links are focused at a hood tilt point to provide a cab articulation about the hood tilt point providing a vertical cab displacement, a reduced pitch movement, and the cab articulation is compatible to a hood articulation about the hood tilt point.

8. The cab and hood suspension system of claim 5, wherein the left and right top cab links are focused at aft the instant center forward of the truck that provides an increased vertical cab displacement, a substantial pitch reduction, and a controlled hood to cab movement.

9. The cab and hood suspension system of claim 1, wherein the cab suspension system including a transverse torque rod at a rear of the cab connected to the chassis configured for maintaining a positive transverse location of the cab at all times, and at least two dampers located at the rear of the cab to control vertical motions.

10. The cab and hood suspension system of claim 1, wherein the hood suspension system includes:
a pair of hood vertical structural extensions from the chassis;
the hood linkage of the hood suspension system is connected between the pair of hood vertical structural extensions and the hood;
wherein the hood linkage including four hood links between the pair of hood vertical structural extensions and the hood, two right hood links on a right side of the hood connected to a right hood vertical structural extension, and two left hood links on a left side of the hood connected to a left hood vertical structural extension;

wherein:
the two right hood links include:
a bottom right hood link that is approximately horizontal and connects the right side of the hood approximate a bottom of the hood with the right hood vertical structural extension;
a top right hood link that connects the right side of the hood near or above a vertical center of mass of the hood with the right hood vertical structural extension, the top right hood link is horizontal or inclined;
the two left hood links include:
a bottom left hood link that is approximately horizontal and connects a left side of the bottom of the hood with the left hood vertical structural extension;
a top left hood link that connects the left side of the hood near or above the vertical center of mass of the hood with the left hood vertical structural extension, the top left hood link is horizontal or inclined;
wherein the hood links are configured to match the movement of the cab, whereby the relative movement between the hood and the cab is approximately matched.

11. The cab and hood suspension system of claim 10, wherein the hood suspension including hood support springs to support the mass of the hood, and hood dampers to control the motion of the hood.

12. The cab and hood suspension system of claim 11 further comprising a hood tilt system provided by the hood linkage of the hood suspension system, wherein the four hood links of the hood suspension system are configured to allow for tilting the hood, wherein the hood support springs are configured to assist in tilting the hood in both opening and closing the hood;
wherein the dampers of the hood suspension system:
limit velocity of the hood to prevent damage for both opening and closing the hood; and
are configured to limit travel of the hood to a fully opened position.

13. The cab and hood suspension system of claim 12, wherein the hood tilt system including:
a supporting structure configured to restrain the hood in a closed position, the supporting structure being located at a lower front edge of the cab on each side; and
latches configured to maintain the contact between the hood and the cab, the latches being mechanical or elastomeric.

14. A cab suspension system for a cab of a truck with a chassis, said cab suspension system comprising, comprising:
supporting spring elements;
cab linkage being focused at an instant center forward of the truck;
a pair of cab vertical structural extensions from the chassis;
the cab linkage of the cab suspension system is connected between the pair of cab vertical structural extensions and the cab;
wherein the cab linkage including four cab links between the pair of cab vertical structural extensions and the cab, two right cab links on a right side of the cab connected to a right cab vertical structural extension, and two left cab links on a left side of the cab connected to a left cab vertical structural extension;

wherein:
the two right cab links include:
a bottom right cab link that is approximately horizontal and connects a right side of a bottom of the cab with the right cab vertical structural extension;

a top right cab link that connects the right side of the cab near or above a vertical center of mass of the cab with the right cab vertical structural extension, the top right cab link is horizontal or inclined;

the two left cab links include:
a bottom left cab link that is approximately horizontal and connects a left side of the bottom of the cab with the left cab vertical structural extension; and
a top left cab link that connects the left side of the cab near or above the vertical center of mass of the cab with the left cab vertical structural extension, the top left cab link is horizontal or inclined;

wherein the supporting spring elements in combination with the cab linkage are configured to control movement of the cab relative to the chassis.

15. The cab suspension system of claim 14, wherein the supporting spring elements comprising:
front air springs located approximate a front of the cab; and
rear air springs located approximate a rear of the cab;
wherein, the front air springs and the rear air springs are located outboard and above the frame under cab structural positions;
wherein:
the front air springs including two front air springs located approximate front corners of the cab; and
the rear air springs including two rear air springs located approximate rear corners of the cab.

16. The cab suspension system of claim 15 further including:
a front common height control valve configured for controlling a height of the front air springs, the front common height control valve is located approximate the front of the cab between the cab and the chassis; and
a rear common height control valve configured for controlling a height of the rear air springs, the rear common height control valve is located approximate the rear of the cab between the cab and the chassis;
whereby, the front common height control valve in combination with the rear common height control valve are configured to keep the cab level and parallel to the chassis regardless of the loading of the cab.

17. The cab and hood suspension system of claim 14, wherein:
the left and right top cab links are parallel and horizontal and provide a cab movement with minimum pitch and maximum vertical displacement, wherein the cab suspension system is used with rigidly mounted hoods;
the left and right top cab links are focused at a hood tilt point to provide a cab articulation about the hood tilt point providing vertical cab displacement, a reduced pitch movement, and the cab articulation compatible to a hood articulation about the hood tilt point; or
the left and right top cab links are focused at instant center forward of the truck that provides vertical cab displacement, a substantial pitch reduction, and a controlled hood to cab movement.

18. The cab and hood suspension system of claim 14, wherein the cab suspension system including a transverse torque rod at the rear of the cab connected to the chassis configured for maintaining a positive transverse location of the cab at all times, and at least two dampers located at the rear of the cab to control vertical motions.

19. A cab and hood suspension system with hood tilt comprising:

a cab suspension system including:
supporting spring elements and cab linkage configured to control movement of a cab relative to a chassis,
wherein the supporting spring elements of the cab suspension system comprising:
front air springs located approximate a front of the cab springs including two front air springs located approximate front corners of the cab; and
rear air springs located approximate a rear of the cab including two rear air springs located approximate rear corners of the cab;
wherein, the front air springs and the rear air springs are located outboard and above the chassis under cab structural positions;
a front common height control valve configured for controlling a height of the front air springs, the front common height control valve is located approximate the front of the cab between the cab and the chassis;
a rear common height control valve configured for controlling a height of the rear air springs, the rear common height control valve is located approximate the rear of the cab between the cab and the chassis;
whereby, the front common height control valve in combination with the rear common height control valve are configured to keep the cab level and parallel to the chassis regardless of the loading of the cab;
a pair of cab vertical structural extensions from the chassis, the cab linkage of the cab suspension system is connected between the pair of cab vertical structural extensions and the cab;
wherein the cab linkage including four cab links between the pair of cab vertical structural extensions and the cab, two right cab links on a right side of the cab connected to a right cab vertical structural extension, and two left cab links on a left side of the cab connected to a left cab vertical structural extension, wherein:
the two right cab links include:
a bottom right cab link that is approximately horizontal and connects a right side of a bottom of the cab with the right cab vertical structural extension;
a top right cab link that connects the right side of the cab near or above a vertical center of mass of the cab with the right cab vertical structural extension, the top right cab link is horizontal or inclined;
the two left cab links include:
a bottom left cab link that is approximately horizontal and connects a left side of the bottom of the cab with the left cab vertical structural extension;
a top left cab link that connects the left side of the cab near or above the vertical center of mass of the cab with the left cab vertical structural extension, the top left cab link is horizontal or inclined;
wherein:
the left and right top cab links are parallel and horizontal and provide a cab movement with minimum pitch and maximum vertical displacement; wherein the cab and hood suspension system is used with rigidly mounted hoods;
the left and right top cab links are focused at a hood tilt point to provide cab articulation about the hood tilt point providing vertical cab displacement, a reduced pitch movement and a cab articulation compatible to a hood articulation about the hood tilt point; or the left and right top cab links are focused at an instant center forward of the vehicle that provides vertical cab displacement, a substantial pitch reduction and a controlled hood to cab movement; and a transverse torque rod at the rear of the cab connected to the chassis configured for maintaining a positive transverse location of the cab at all times, and at least two dampers located at the rear of the cab to control vertical motions;

a hood suspension system including hood linkage configured to locate the hood relative to the chassis, wherein the hood linkage is configured to match the movement of the cab linkage;

wherein the hood suspension system includes:

a pair of hood vertical structural extensions from the chassis;

the hood linkage of the hood suspension system is connected between the pair of cab vertical structural extensions and the cab;

wherein the cab linkage including four cab links between the hood vertical structural extensions and the hood, two right hood links on a right side of the hood connected to a right hood vertical structural extension, and two left hood links on a left side of the hood connected to a left hood vertical structural extension;

wherein:

the two right hood links include:

a bottom right hood link that is approximately horizontal and connects a right side of a bottom of the hood with the right hood vertical structural extension;

a top right hood link that connects the right side of the hood near or above a vertical center of mass of the hood with the right hood vertical structural extension, the top right hood link is horizontal or inclined;

the two left hood links include:

a bottom left hood link that is approximately horizontal and connects a left side of the bottom of the hood with the left hood vertical structural extension;

a top left hood link that connects the left side of the hood near or above the vertical center of mass of the hood with the left hood vertical structural extension, the top left hood link is horizontal or inclined;

wherein the hood links are configured to match the movement of the cab, whereby the relative movement between the hood and the cab is reduced;

wherein the hood suspension including hood support springs to support the mass of the hood, and dampers to control the motion; and a hood tilt system provided by the hood linkage of the hood suspension system, wherein the four hood links of the hood suspension system provide locating elements of the hood tilt system for tilting the hood;

wherein the hood support springs provide a tilt effort assist function for the hood tilt system in both opening and closing the hood;

wherein the dampers of the hood suspension system:

limit the velocity of the hood to prevent damage for both opening and closing the hood; and provide a travel limiting device when the hood is fully opened;

wherein the hood tilt system including a supporting structure configured to restrain the hood in a closed position, the supporting structure being located at the lower front edge of the cab on each side; and wherein the hood tilt system including latches configured to maintain the contact between the hood and the cab, the latched being mechanical or elastomeric.

\* \* \* \* \*